United States Patent
Nam et al.

(10) Patent No.: US 11,627,319 B2
(45) Date of Patent: Apr. 11, 2023

(54) IMAGE DECODING METHOD AND APPARATUS ACCORDING TO BLOCK DIVISION STRUCTURE IN IMAGE CODING SYSTEM

(71) Applicant: LG Electronics Inc., Seoul (KR)

(72) Inventors: Junghak Nam, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/552,204

(22) Filed: Dec. 15, 2021

(65) Prior Publication Data
US 2022/0109837 A1    Apr. 7, 2022

Related U.S. Application Data

(63) Continuation of application No. 16/971,883, filed as application No. PCT/KR2018/002177 on Feb. 22, 2018, now Pat. No. 11,233,996.

(51) Int. Cl.
*H04N 11/02*    (2006.01)
*H04N 19/119*    (2014.01)
(Continued)

(52) U.S. Cl.
CPC ......... *H04N 19/119* (2014.11); *H04N 19/105* (2014.11); *H04N 19/176* (2014.11); *H04N 19/51* (2014.11); *H04N 19/91* (2014.11)

(58) Field of Classification Search
CPC .................................................... H04N 19/119
(Continued)

(56) References Cited

U.S. PATENT DOCUMENTS 9,071,851 B2 *    6/2015    Guo .................... H04N 19/176
10,931,965 B2 *    2/2021    Zhao ..................... H04N 19/52
(Continued)

FOREIGN PATENT DOCUMENTS

EP    2568706    3/2013
EP    2755389    7/2014
(Continued)

OTHER PUBLICATIONS

Office Action in European Application No. 18907196.2, dated Apr. 25, 2022, 5 pages.
(Continued)

*Primary Examiner* — Leron Beck
(74) *Attorney, Agent, or Firm* — Fish & Richardson P.C.

(57) ABSTRACT

Provided is a video decoding method performed by a decoding apparatus, which includes: obtaining split information for a target block from a bitstream; splitting the target block into a first sub-block and a second sub-block based on a split boundary indicated by the split information; deriving a first motion information candidate list for the first sub-block and a second motion information candidate list for the second sub-block based on the split information for the target block; performing inter prediction of the first sub-block based on the first motion information candidate list; and performing inter prediction of the second sub-block based on the second motion information candidate list, in which the first sub-block and the second sub-block are non-rectangular blocks, and the first motion information candidate list for the first sub-block is different from the second motion information candidate list for the second sub-block.

12 Claims, 18 Drawing Sheets

(51) Int. Cl.
*H04N 19/105* (2014.01)
*H04N 19/176* (2014.01)
*H04N 19/51* (2014.01)
*H04N 19/91* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 2009/0196342 A1* | 8/2009 | Divorra Escoda ... | H04N 19/159 375/E7.126 |
| 2010/0208818 A1* | 8/2010 | Yin ........................ | H04N 19/13 375/E7.243 |
| 2010/0208827 A1* | 8/2010 | Divorra Escoda ... | H04N 19/176 375/240.24 |
| 2011/0200097 A1* | 8/2011 | Chen .................... | H04N 19/513 375/E7.243 |
| 2012/0106627 A1 | 5/2012 | Guo et al. | |
| 2013/0266070 A1* | 10/2013 | Sato ...................... | H04N 19/52 375/240.16 |
| 2013/0301716 A1* | 11/2013 | Zheng ................... | H04N 19/46 375/240.12 |
| 2015/0163506 A1 | 6/2015 | Chon et al. | |
| 2015/0264351 A1* | 9/2015 | Miyoshi ............... | H04N 19/139 375/240.13 |
| 2018/0041768 A1 | 2/2018 | Koo et al. | |

FOREIGN PATENT DOCUMENTS

| | | |
|---|---|---|
| JP | 2012-80369 | 4/2012 |
| KR | 101387276 | 4/2014 |
| KR | 20140099430 | 8/2014 |
| KR | 20160095098 | 8/2016 |
| KR | 20170131448 | 11/2017 |
| WO | WO2012177644 | 12/2012 |
| WO | WO2015006884 | 1/2015 |
| WO | WO2017084512 | 5/2017 |
| WO | WO2018012886 | 1/2018 |

OTHER PUBLICATIONS

Office Action in Japanese Application No. 2020-543839, dated Mar. 29, 2022, 8 pages (with English translation).
Office Action in Korean Application No. 10-2020-7022484, dated Apr. 8, 2022, 14 pages (with English translation).
Blaser et al., "Geometry-Adaptive Motion Partitioning Using Improved Temporal Prediction," IEEE Visual Communications and Image Processing (VCIP), Dec. 2017, 4 pages.
Extended European Search Report in European Appln. No. 18907196.2, dated Jul. 29, 2021.

* cited by examiner (a)

(b)

(c)

(d)

(e)

(f)

(a)

(b)

(c)

(d)

IMAGE DECODING METHOD AND APPARATUS ACCORDING TO BLOCK DIVISION STRUCTURE IN IMAGE CODING SYSTEM

CROSS-REFERENCE TO RELATED APPLICATIONS

This application is a continuation of U.S. application Ser. No. 16/971,883, filed on Aug. 21, 2020, which is a National Stage application under 35 U.S.C. § 371 of International Application No. PCT/KR2018/002177, filed on Feb. 22, 2018. The disclosures of the prior applications are incorporated by reference in their entirety.

BACKGROUND OF THE DISCLOSURE

Field of the Disclosure

The present disclosure relates to video coding technology, and more particularly, to a video decoding method and a video decoding apparatus according to a block split structure in a video coding system.

Related Art

Demand for high-resolution, high-quality images such High Definition (HD) images and Ultra High Definition (UHD) images have been increasing in various fields. As the image data has high resolution and high quality, the amount of information or bits to be transmitted increases relative to the legacy image data. Accordingly, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE DISCLOSURE

The present disclosure provides a method and an apparatus for increasing video coding efficiency.

The present disclosure also provides a method and an apparatus for predicting a target block split through a geometry partition (GP) structure.

The present disclosure also provides a method and an apparatus for deriving neighboring blocks for deriving motion information candidates of blocks split through the geometry partition (GP) structure.

The present disclosure also provides a method and an apparatus for performing filtering of the blocks split through the GP structure.

The present disclosure also provides a method and an apparatus for performing transforming of the blocks split through the GP structure.

In an aspect, a video decoding method performed by a decoding apparatus is proposed. The method includes: obtaining split information for a target block from a bitstream; splitting the target block into a first sub-block and a second sub-block based on a split boundary indicated by the split information; deriving a first motion information candidate list for the first sub-block and a second motion information candidate list for the second sub-block based on the split information for the target block; performing inter prediction of the first sub-block based on the first motion information candidate list; and performing inter prediction of the second sub-block based on the second motion information candidate list, in which the first sub-block and the second sub-block are non-rectangular blocks, and the first motion information candidate list for the first sub-block is different from the second motion information candidate list for the second sub-block.

In another aspect, a decoding apparatus performing video decoding is proposed. The decoding apparatus includes: an entropy decoder obtaining split information for a target block from a bitstream; a picture splitting the target block into a first sub-block and a second sub-block based on a split boundary indicated by the split information; and a predictor deriving a first motion information candidate list for the first sub-block and a second motion information candidate list for the second sub-block based on the split information for the target block, performing inter prediction of the first sub-block based on the first motion information candidate list, and performing inter prediction of the second sub-block based on the second motion information candidate list, in which the first sub-block and the second sub-block are non-rectangular blocks, and the first motion information candidate list for the first sub-block is different from the second motion information candidate list for the second sub-block.

In yet another aspect, a video encoding method performed by an encoding apparatus is proposed. The method includes: splitting a target block into a first sub-block and a second sub-block; deriving a first motion information candidate list for the first sub-block and a second motion information candidate list for the second sub-block based on a split type of the target block; performing inter prediction of the first sub-block based on the first motion information candidate list; performing inter prediction of the second sub-block based on the second motion information candidate list, and encoding and transmitting split information and residual information for the target block, in which the first sub-block and the second sub-block are non-rectangular blocks, and the first motion information candidate list for the first sub-block is different from the second motion information candidate list for the second sub-block.

In still yet another aspect, a video encoding apparatus is proposed. The encoding apparatus includes: a picture partitioner splitting a target block into a first sub-block and a second sub-block; a predictor deriving a first motion information candidate list for the first sub-block and a second motion information candidate list for the second sub-block based on a split type of the target block, performing inter prediction of the first sub-block based on the first motion information candidate list, and performing inter prediction of the second sub-block based on the second motion information candidate list; and an entropy encoder encoding and transmitting split information and residual information for the target block, in which the first sub-block and the second sub-block are non-rectangular blocks, and the first motion information candidate list for the first sub-block is different from the second motion information candidate list for the second sub-block.

According to the present disclosure, according to split types of blocks split through a GP structure, spatial motion information candidates of the blocks can be derived, thereby enhancing prediction efficiency and enhancing overall coding efficiency.

According to the present disclosure, according to the split types of blocks split through the GP structure, temporal motion information candidates of the blocks can be derived, thereby enhancing the prediction efficiency and enhancing the overall coding efficiency.

According to the present disclosure, filtering samples around a boundary of the blocks split through the GP structure can be performed, thereby enhancing prediction accuracy and enhancing the overall coding efficiency.

According to the present disclosure, a transform process of the blocks split through the GP structure can be performed, thereby enhancing transform efficiency and enhancing the overall coding efficiency.

DESCRIPTION OF EXEMPLARY EMBODIMENTS

Figure 1:
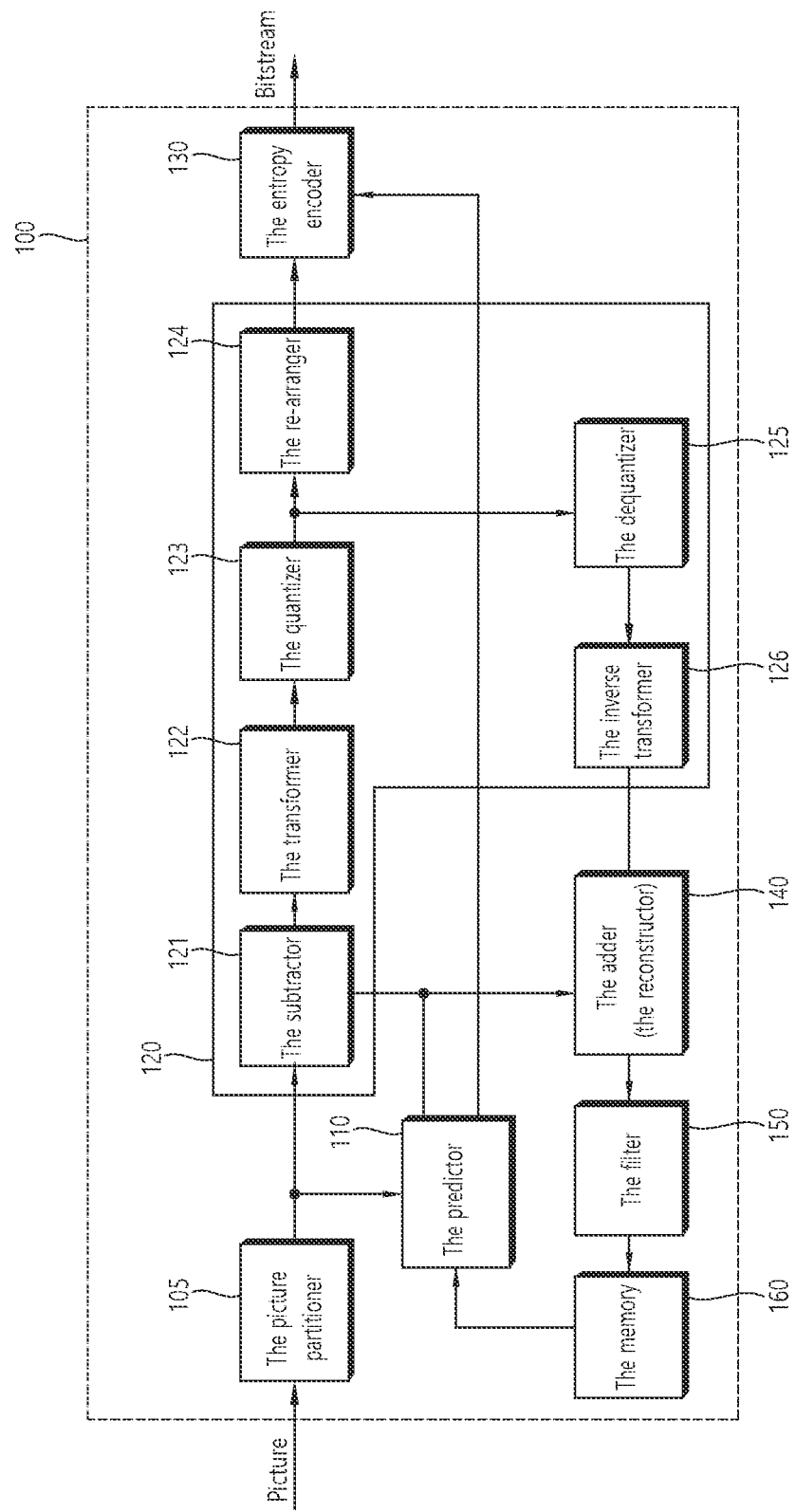
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be split into plural elements. The embodiments in which the elements are combined and/or split belong to the disclosure without departing from the concept of the disclosure.

Hereinafter, embodiments of the present disclosure will be described in detail with reference to the accompanying drawings. Further, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding apparatus to which the present disclosure is applicable.

Referring to FIG. 1, a video encoding apparatus (100) may include a picture partitioner (105), a predictor (110), a residual processor (120), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be split into sub-blocks. The transform unit may be split from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of predicted samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including predicted samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a predicted sample for the current block based on a reference sample outside the current block in a picture to which the current block belongs (hereinafter, a current picture). In this case, the predictor (110) may derive the predicted sample based on an average or interpolation of neighboring reference samples of the current block (case (i)), or may derive the predicted sample based on a reference sample existing in a specific (prediction) direction as to a predicted sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the predicted sample for the current block based on a sample specified by a motion vector on a reference picture. The predictor (110) may derive the predicted sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the predicted sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor (121) generates a residual sample which is a difference between an original sample and a predicted sample. If the skip mode is applied, the residual sample may not be generated as described above.

The transformer (122) transforms residual samples in units of a transform block to generate a transform coefficient. The transformer (122) may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction Further to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a predicted sample to reconstruct a picture. The residual sample may be added to the predicted sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
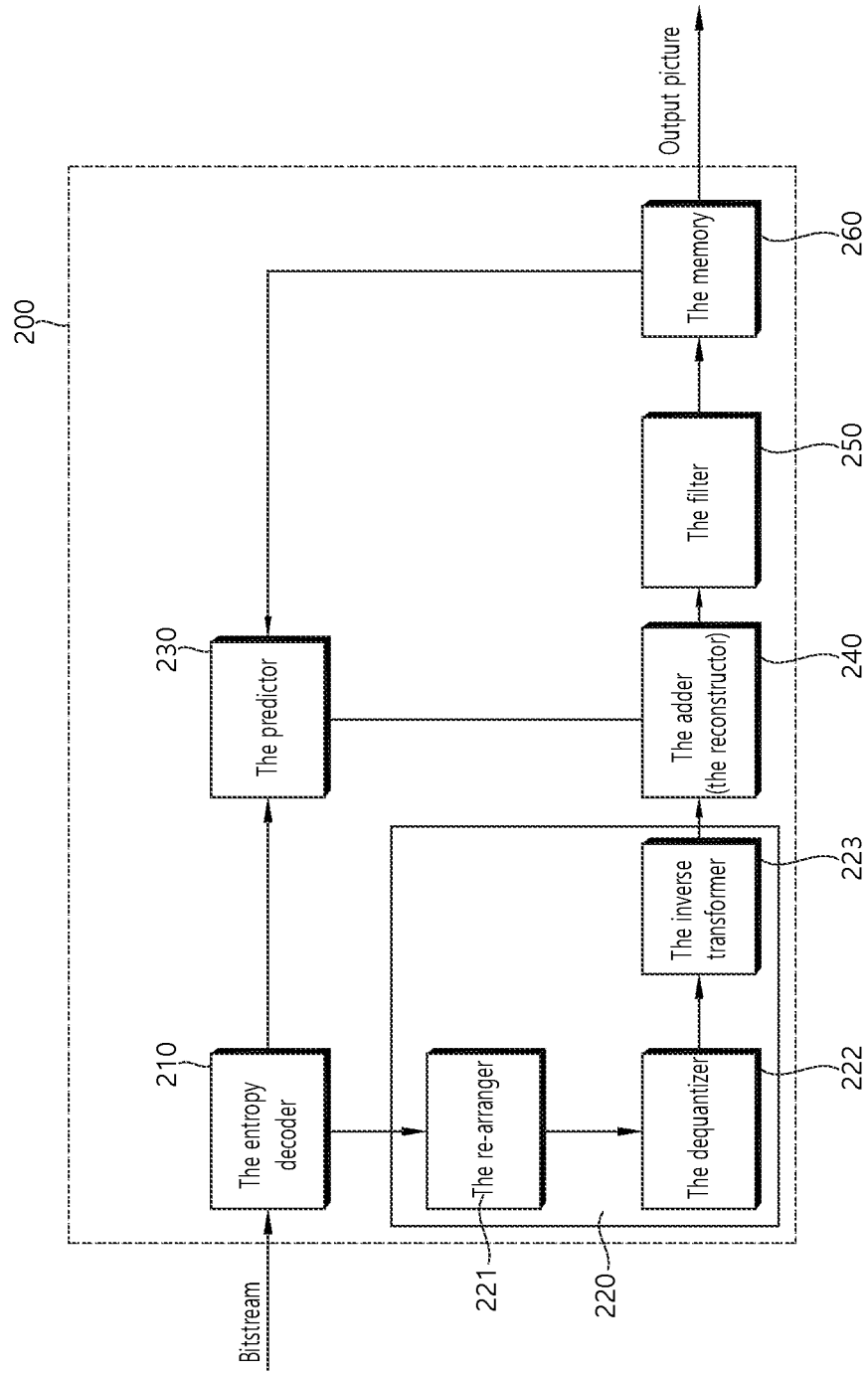
FIG. 2 is a schematic diagram illustrating a configuration of a video decoding apparatus to which the present disclosure is applicable.

FIG. 2 is a schematic diagram illustrating a configuration of a video decoding apparatus to which the present disclosure is applicable.

Referring to FIG. 2, a video decoding apparatus (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding apparatus (200) may reconstruct a video in relation to a process by which video information is processed in the video encoding apparatus.

For example, the video decoding apparatus (200) may perform video decoding using a processing unit applied in the video encoding apparatus. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be split into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information on prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding apparatus. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information about deriving a quantization parameter may be signaled from the encoding apparatus.

The inverse transformer (223) may inverse-transform the transform coefficients to derive residual samples.

The predictor (230) may perform prediction on a current block, and may generate a predicted block including predicted samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a predicted sample. Further, a unit for generating the predicted sample may also be different in the inter-prediction and the intra-prediction. For example, which one will be applied between the inter-prediction and the intra-prediction may be determined in unit of CU. Further, for example, in the inter-prediction, the predicted sample may be generated by determining the prediction mode in unit of PU, and in the intra-prediction, the predicted sample may be generated in unit of TU by determining the prediction mode in unit of PU.

In case of the intra-prediction, the predictor (230) may derive a predicted sample for a current block based on a neighboring reference sample in a current picture. The predictor (230) may derive the predicted sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a predicted sample for a current block based on a sample specified in a reference picture according to a motion vector. The predictor (230) may derive the predicted sample for the current block using one of the skip mode, the merge mode and the MVP mode. Here, motion information required for inter-prediction of the current block provided by the video encoding apparatus, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a predicted sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor (230) may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor (230) may obtain a motion vector included in the information on prediction and derive the motion vector of the current block by adding the motion vector difference to the motion vector predictor. Further, the predictor may obtain or derive a reference picture index indicating a reference picture from the aforementioned information on prediction.

The adder (240) may add a residual sample to a predicted sample to reconstruct a current block or a current picture. The adder (240) may reconstruct the current picture by adding the residual sample to the predicted sample in units of a block. When the skip mode is applied, a residual is not transmitted and thus the predicted sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

When coding for an input picture is performed like the aforementioned contents, the coding may be performed based on one processing unit. The processing unit may be referred to as a coding unit (CU). Meanwhile, as the coding is performed in units of regions including similar information in the picture, transform efficiency may be enhanced, thereby enhancing overall coding efficiency. Further, as the coding is performed in units of regions including the similar information in the picture, prediction accuracy may be enhanced, thereby enhancing the overall coding efficiency. However, when only a quad tree (QT) structure is applied and the picture is thus split into only square CUs, it may be limited to split the CUs to include only accurately similar information. For example, information indicating a specific object in the picture may be positioned widely in a diagonal direction and in this case, when the information indicating the specific object is included in one CU, a lot of information other than the information indicating the specific object may be included and when the information indicating the specific object is included in a plurality of square CUs, coding for each of the plurality of CUs should be performed, and as a result, the coding efficiency may deteriorate. In this case, the coding efficiency may be further enhanced by splitting the picture into a non-square CU including the information indicating the specific object. Therefore, a method for splitting an input picture into a square CU and a non-square CU by applying another split structure together with the quad tree structure may be proposed. Therefore, the picture may be split into various types of CUs according to the information in the picture and the coding may be more efficiently performed. For example, the picture may be split through a quad tree geometry partition (QTGP) structure.

Figure 3:
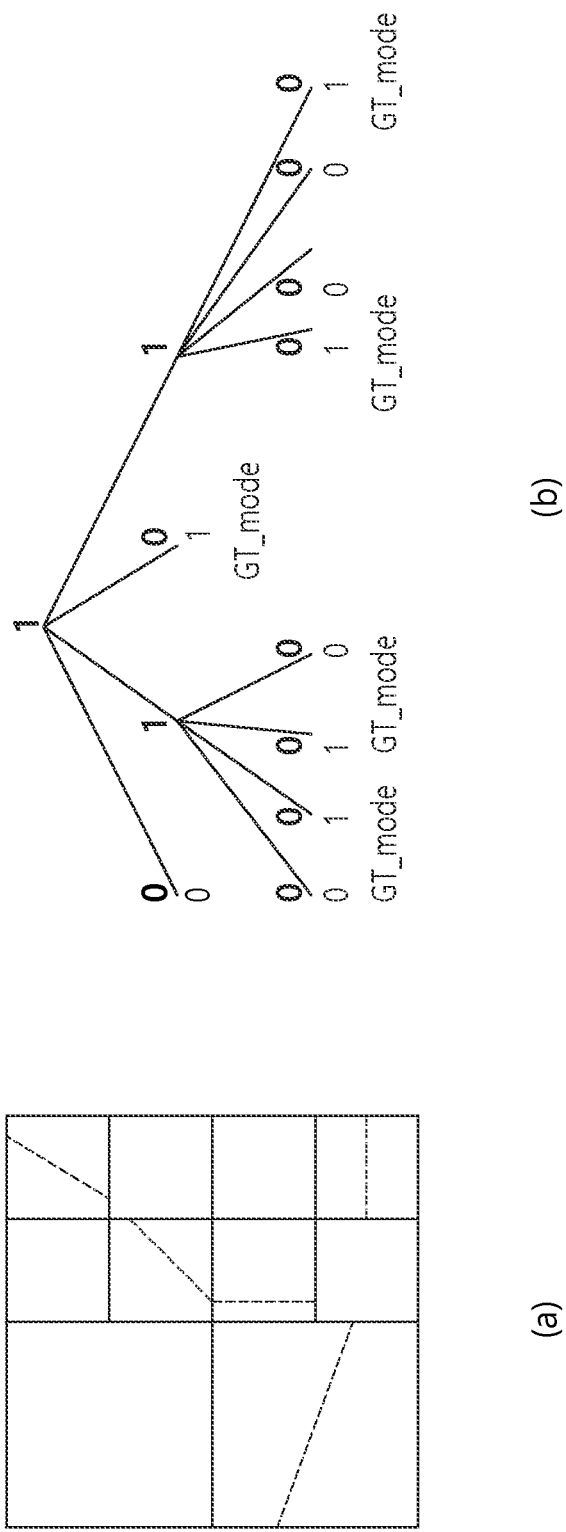
FIG. 3 exemplarily illustrates CUs split through a QTGP structure and a syntax of the QTGP structure.

FIG. 3 exemplarily illustrates CUs split through a QTGP structure and a syntax of the QTGP structure.

The QTGP structure may indicate a structure in which a CU (or CTU) is split through a QT structure and through a geometry partition (GP) structure. The GP structure may also be called a geometry tree (GT) structure. That is, the QTGP structure may indicate a split structure configured in a form in which the QT structure and the GP structure are combined and when the picture is coded in units of CTU, the CTU may be split through the QT structure and a leaf node of the QT structure may be additionally split through the GP structure. Here, the GP structure may indicate a structure in which the CU is split into various types of non-square sub-CUs. That is, various types of non-square sub-CUs may be derived in addition to non-square sub-CUs having a size of N×2N or 2N×N. Referring to FIG. 3A, the CU may be split into lower-depth square CUs through the QT structure and additionally, a specific CU among the square CUs may be split into lower-depth non-square CUs through the GP structure.

FIG. 3B may illustrate an example in which the syntax of the QTGP structure is transmitted. A solid line illustrated in FIG. 3B may indicate the QT structure and a dotted line may indicate the GP structure. Further, from top to bottom, the syntax for the CU of a lower depth at a higher depth may be illustrated. Further, in the direction from left to right, the syntaxes for upper-left, upper-right, lower-left, and lower-right CUs may be illustrated. Specifically, an uppermost number may indicate the syntax for a CU of n depth, numbers at a second position from the top may indicate CUs of n+1 depth, numbers at a third position from the top may indicate CUs of n+2 depth, and numbers at a fourth position from the top may indicate syntaxes for CUs of n+3 depth. In addition, numbers displayed in bold may indicate values of syntaxes for the QT structure and numbers not displayed in bold may indicate values for syntaxes for the GP structure.

Referring to FIG. 3B, a QT split flag indicating whether the CU is split through the QT structure may be transmitted. That is, a flag indicating whether the 2N×2N sized CU is split into four N×N sized sub-CUs may be transmitted. QT_split_flag may indicate a syntax element for the QT split flag. For example, when the value of the QT split flag for the CU is 1, the CU may be split into four sub-CUs and when the value of the QT split flag for the CU is 0, the CU may not be split. Further, in order to adjust the QT structure for an input image, information on a maximum CU size, a minimum CU size, a maximum depth, etc., in the QT structure may be transmitted. The information for the QT structure may be transmitted for each of slice types or transmitted for each of image components (luminance component, chroma component, etc.).

Referring to FIG. 3B, information on the GP structure may be transmitted to a terminal node that is no longer split in the QT structure. That is, the information on the GP structure for a corresponding to the terminal node may be transmitted in the QT structure. Here, information including the information on the GP structure may be called GP split information. For example, a GP split flag indicating whether the CU is split through the GP structure, i.e., whether the GP structure is applied to the CU may be transmitted. GP_split_flag (or GT_split_flag) may indicate a syntax element for the GP split flag. Specifically, when the value of the GP split flag is 1, the CU may be split into two sub-CUs and when the value of the GP split flag is 0, the CU may not be split.

Meanwhile, when the GP split flag for the CU indicates that the GP structure is applied to the CU, information on a split angle and/or a distance from a center of the CU may be transmitted in order to derive a split type through the GP structure. That is, information on a split boundary for the CU may be transmitted and the CU may be split based on a split boundary derived based on the information.

Figure 4:
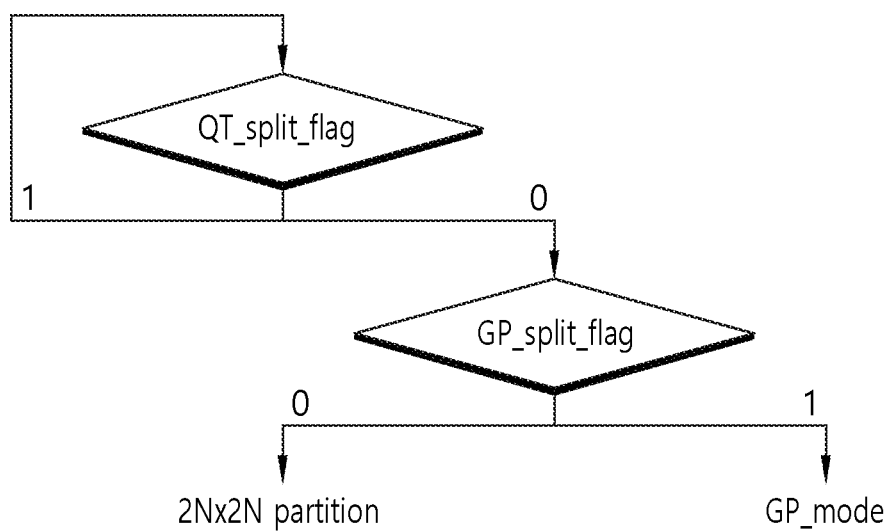
FIG. 4 illustrates an example in which the syntaxes of the QTGP structure for a target CU are transmitted.

FIG. 4 illustrates an example in which the syntaxes of the QTGP structure for a target CU are transmitted.

Referring to FIG. 4, QT_split_flag for a target CU may be transmitted. The QT_split_flag may indicate whether the target CU is split through the QT structure as described above. That is, the QT_split_flag may indicate whether the target CU is split into sub-CUs having sizes of a half height and a half width of the target CU.

Specifically, for example, when the value of the QT_split_flag of the target CU is 1, i.e., when the QT_split_flag indicates that the target CU is split into the sub-CUs having the sizes of the half height and the half width of the target CU, the target CU may be split into the sub-CUs. In this case, the QT_split_flag for the sub-CUs may be transmitted. That is, the target CU is split into even lower-depth CUs coding-recursively and CUs of the terminal node which is no longer split may be derived.

Meanwhile, when the value of the QT_split_flag of the target CU of the terminal node is 0, i.e., when the QT_split_flag indicates that the target CU is not split into the sub-CUs having the sizes of the half height and the half width of the target CU, GP_split_flag for the target CU may be transmitted. The GP_split_flag may indicate whether the target CU is split through the GP structure as described above. That is, the GP_split_flag may indicate whether the target CU having the 2N×2N size is split into various types of non-square sub-CUs, for example. When the GP structure is applied to the target CU, shapes of the CUs split from the target CU may be determined according to the GP_split_flag and a GP_mode value.

Specifically, when the value of the GP_split_flag is 1, the target CU may be split into split types indicated by the GP_mode and when the value of the GP_split_flag is 0, the split type of the target CU may be derived as a 2N×2N type. In other words, when the value of the GP_split_flag is 0, the target CU having the 2N×2N size may not be split. When the GP_split_flag indicates that the target CU is split through the GP structure, the GP_mode for the target CU may be transmitted. The GP_mode may be an index indicating in which direction the target CU is split, i.e., the split type of the target CU. The index indicating the split type may be called a GP split mode index. In this case, the split type of the CU may be derived based on the index and the CU may be split into non-square sub-CUs based on the split type. For example, (N/4)×2N type, (N/2)×2N type, N×2N type, 2N×N type and 2N×(N/2), 2N×(N/4) type may be preset to the specific split types and the index may indicate one of the types.

Further, syntaxes of the QTGP structure may be shown as in the following table.

TABLE 1

| | Description |
|---|---|
| coding quadtree ( x0, y0, log2CbSize, cqtDepth ) { | |
|    QT_split_flag[ x0 ][ y0 ] | ae(v) |
|    if( QT split flag[ x0 ][ y0 ] ) { | |
|       x1 = x0 + ( 1 << ( log2CbSize − 1 ) ) | |
|       y1 = y0 + ( 1 << ( log2CbSize − 1 ) ) | |
|       coding quadtree( x0, y0, log2CbSize − 1, cqtDepth + 1 ) | |

TABLE 1-continued

|  | Descriptor |
|---|---|
| ```
        if( x1 < pic width in luma samples )
            coding quadtree ( x1, y0, log2CbSize − 1,
                cqtDepth + 1)
        if( y1 < pic height in luma samples )
            coding quadtree ( x0, y1, log2CbSize − 1,
                cqtDepth + 1 )
        if( x1 < pic width in luma samples && y1 < pic height in
        luma samples )
            coding quadtree ( x1, y1, log2CbSize − 1,
                cqtDepth + 1 )
    } else {
        GP_split_flag[ x0 ][ y0 ]
        if ( GP_split_flag[ x0 ][ y0 ]) {
            GP_mode[ x0 ][ y0 ]
            coding_unit ( x0, y0, log2CbSize, log2CbSize,
                GP0 )
            coding_unit ( x0, y0, log2CbSize, log2CbSize,
                GP1 )
        } else {
            coding_unit( x0, y0, log2CbSize, log2CbSize )
        }
    }
}
``` | <br><br><br><br><br><br><br><br><br><br>ae(v)<br><br>ae(v) |

Here, QT_split_flag may indicate the syntax element of the aforementioned QT split flag, GP_split_flag may indicate the syntax element of the aforementioned GP_split_flag, and GP_mode may indicate the syntax element of the aforementioned GP split mode index.

Meanwhile, when the GP split flag for the CU indicates that the GP structure is applied to the CU, the information on the split angle and/or the distance from the center of the CU may be transmitted in order to derive the split type through the GP structure. That is, the information on the split boundary for the CU may be transmitted and the CU may be split based on the split boundary derived based on the information.

Figure 5:
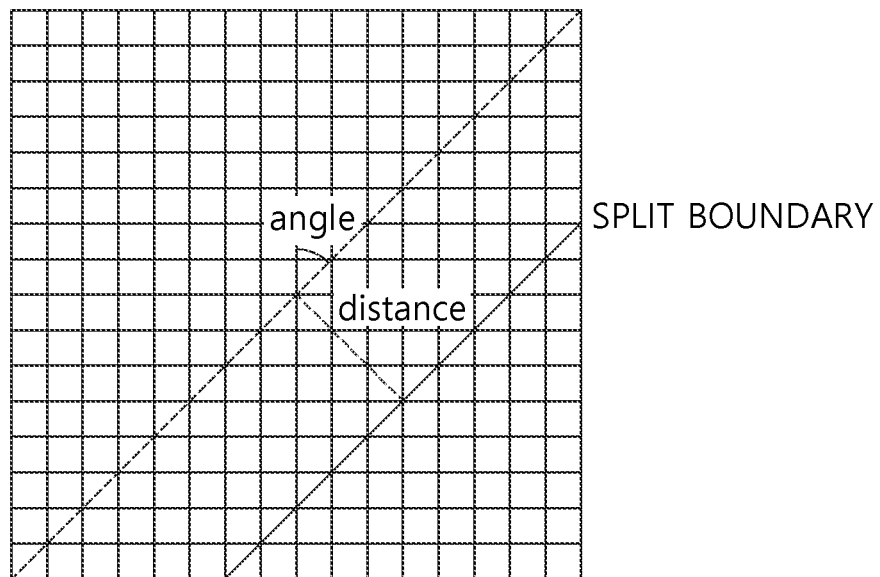
FIG. 5 exemplarily illustrates a split boundary derived based on information on a split structure and/or a distance from a center point of the CU.

FIG. 5 exemplarily illustrates a split boundary derived based on information on a split structure and/or a distance from a center point of the CU. Referring to FIG. 5, an angle of a direction (or a boundary) in which the CU is split may be derived based on the information on the split angle and a location of the boundary at which the CU is split may be derived based on the information on the distance from the center. The split boundary may be derived based on the information on the split angle and the information on the distance from the center, and the CU may be split based on the derived split boundary.

For example, when the value of the split angle derived based on the information on the split angle is 0 degree and the distance from the center derived from the information on the distance from the center is 0, the split boundary may vertically pass through the center of the CU and the CU having the 2N×2N size may be split similarly to a type in which is split into N×2N sized sub-CUs in the BT structure. Further, when the value of the split angle derived based on the information on the split angle is 90 degrees and the distance from the center derived from the information on the distance from the center is 0, the split boundary may horizontally pass through the center of the CU and the CU having the 2N×2N size may be split similarly to a type in which is split into N×2N sized sub-CUs in the BT structure. Further, as the split angle for the CU, 11.25 degrees, 25 degrees, 45 degrees, or 90 degrees may be selectively used according to a split degree and evenly split in an angle range of 360 degrees or unevenly split around a specific angle.

Further, as a unit of the distance from the center, 1 sample, 2 samples, or 4 samples may be selectively used according to the split degree or a distance unit adaptively derived according to the size of the CU may be used. For example, when the size of the CU is a 4×4 size, the unit of the distance from the center for the CU may be derived as 1 sample and when the size of the CU is an 8×8 size, the unit of the distance from the center for the CU may be derived as 2 samples. Therefore, the distance from the center for the CU may be derived, and as a result, for example, when a value of split information indicating the distance from the center obtained through a bitstream is x, the distance from the center may be derived as x samples if the unit of the distance is 1 sample and the distance from the center may be derived as 2x samples if the unit of the distance is 2 samples. Further, when the size of the CU is a 16×16 size, the unit of the distance from the center may be derived as 4 samples. Meanwhile, as the distance from the center of the CU increases, the unit may be applied larger. Specifically, for example, when the size of the CU is a 32×32 size, if the value of the distance from the center of the CU is 4 or less, the 1 sample-unit distance may be used, if the value of the distance from the center is more than 4 and 8 or less, the 2 sample-unit distance may be used, and if the value of the distance from the center is more than 8, the 4 sample-unit distance may be used.

In order to indicate the split information for the CU, the syntax element for each of the information indicating the split angle and the information indicating the distance from the center may be transmitted to a decoding apparatus or one index for the information indicating the split information and the distance from the center may be transmitted.

Meanwhile, when inter prediction is applied to a target block split in the GP structure, motion information of the target block may be derived based on motion information of a neighboring block of the target block. Specifically, a motion information candidate list may be configured, which includes candidates representing motion information of neighboring blocks of the target block, an index indicating one of the candidates of the motion information candidate list may be received, and the motion information of the target block may be derived based on the motion information of the candidate indicated by the index. The motion information candidate list may indicate a merge candidate list or a motion vector predictor candidate list according to whether a prediction mode of the target block is a merge mode or an MVP mode.

For example, when the merge mode is applied to the target block, a merge candidate list may be configured, which includes candidates representing the motion information of the neighboring blocks and motion information of a candidate which a merge index indicates on the merge candidate list may be used as the motion information of the target block. The merge index may be signaled from an encoding apparatus, and as a result, the merge index may indicate a candidate having optimal motion information selected among the candidates included in the merge candidate list. The motion information of the candidate may include a motion vector and a reference picture index. The neighboring blocks may include a spatial neighboring block and a temporal neighboring block of the target block and the merge candidate list may include a spatial candidate representing motion information of the spatial neighboring block and a temporal candidate representing motion information of the temporal neighboring block.

Further, as another example, in the case of a motion vector prediction (MVP) mode, the motion vector predictor candidate list may be generated in the target block by using a motion vector of a reconstructed spatial neighboring block and/or a motion vector corresponding to a Col block which is the temporal neighboring block. In other words, the motion vector predictor candidate list including the motion vector of the reconstructed spatial neighboring block and/or the motion vector corresponding to the temporal neighboring block may be generated as the candidate. The candidate representing the motion vector of the spatial neighboring block may be represented as a spatial candidate and the candidate representing the motion vector of the temporal neighboring block may be represented as a temporal candidate. A motion vector predictor flag may be transmitted, which indicates the candidate selected among the candidates included in the motion vector predictor candidate list and the candidate indicated by the motion vector predictor flag among the candidates of the motion vector candidate list may be selected as the motion vector predictor (MVP) of the target block. In this case, a motion vector difference (MVD) between the motion vector of the target block and the MVP may be transmitted through the bitstream and the motion vector of the target block may be derived through addition of the MVD and the MVP.

When the merge candidate list or the MVP candidate list of the target block is generated based on the motion information of the neighboring blocks of the target block as described above, the spatial candidates included in the merge candidate list or the MVP candidate list may be derived based on the following spatial neighboring blocks.

Figure 6:
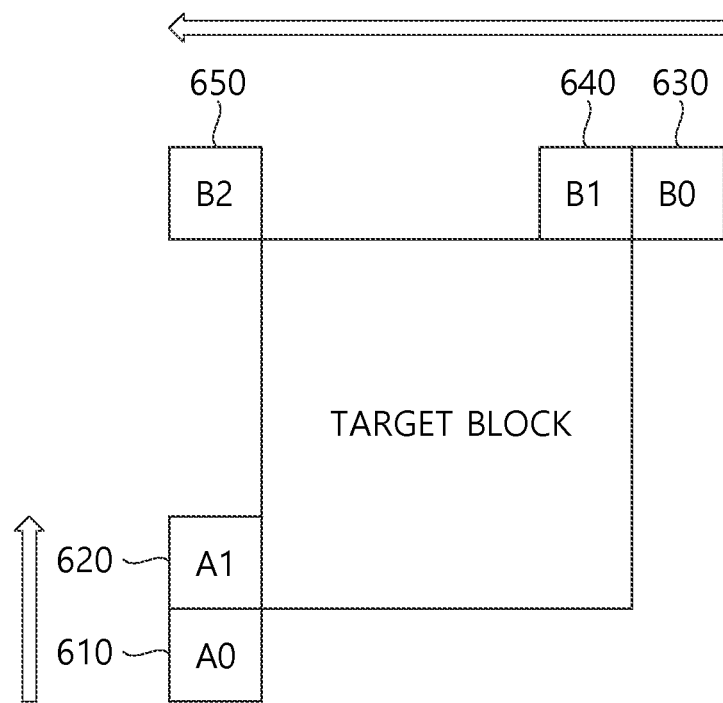
FIG. 6 exemplarily illustrates spatial neighboring blocks of a target block.

FIG. 6 exemplarily illustrates spatial neighboring blocks of a target block. In a legacy video coding system, the merge candidate list or MVP candidate list may be configured based on neighboring blocks at a predetermined location around the target block. For example, as illustrated in FIG. 6, two blocks A0 610 and A1 620 positioned at a left side of the target block and three blocks B0 630, B1 640, and B2 650 at an upper side of a current block may be selected as the spatial candidates. Here, A0 610 may be called a lower left neighboring block and A1 620 may be called a left neighboring block. In addition, B0 630 may be called an upper right neighboring block, B1 640 may be called an upper neighboring block, and B2 650 may be called an upper left neighboring block.

Specifically, when the merge mode is applied to the target block, the merge candidate list may be configured, which includes motion information of the A0 610, the A1 620, the B0 630, the B1 640, and/or the B2 650 as the spatial candidates. Further, when the AMVP mode is applied to the target block, one motion vector of the A0 610 and the A1 620 may be included in the MVP candidate list as the spatial candidate and one motion vector of the B0 630, the B1 640, and the B2 650 may be included in the MVP candidate list as the spatial candidate. It may be determined whether the motion vector of the neighboring block is used in the MVP candidate list in the order of the direction illustrated in FIG. 6, and as a result, the determination may be performed in the order of the A0 610 and the A1 620 and the determination may be performed in the order of the B0 630, the B1 640, and the B2 650.

Meanwhile, when the target block is a block split through the aforementioned GP structure, the form of the block may be variously derived, and as a result, a method for deriving motion information of the target block based on a neighboring block at a fixed location may not be effective. Specifically, there is a high probability that motion information of a block adjacent to the target block will be similar to the motion information of the target block, and the form of the target block split through the GP structure may be derived in various forms, and as a result, a location of a most adjacent neighboring block may vary depending on the form of the target block. Accordingly, changing the location of the neighboring block used as the candidate for the motion information of the target block based on the form of the target block split through the GP structure may be effective to more accurately derive the motion information of the target block.

Accordingly, the present disclosure proposes a method for predicting a spatial motion vector according to the form of the target block split through the GP structure. That is, the present disclosure proposes locations of spatial neighboring blocks according to the form of the target block split through the GP structure.

Figure 7A:
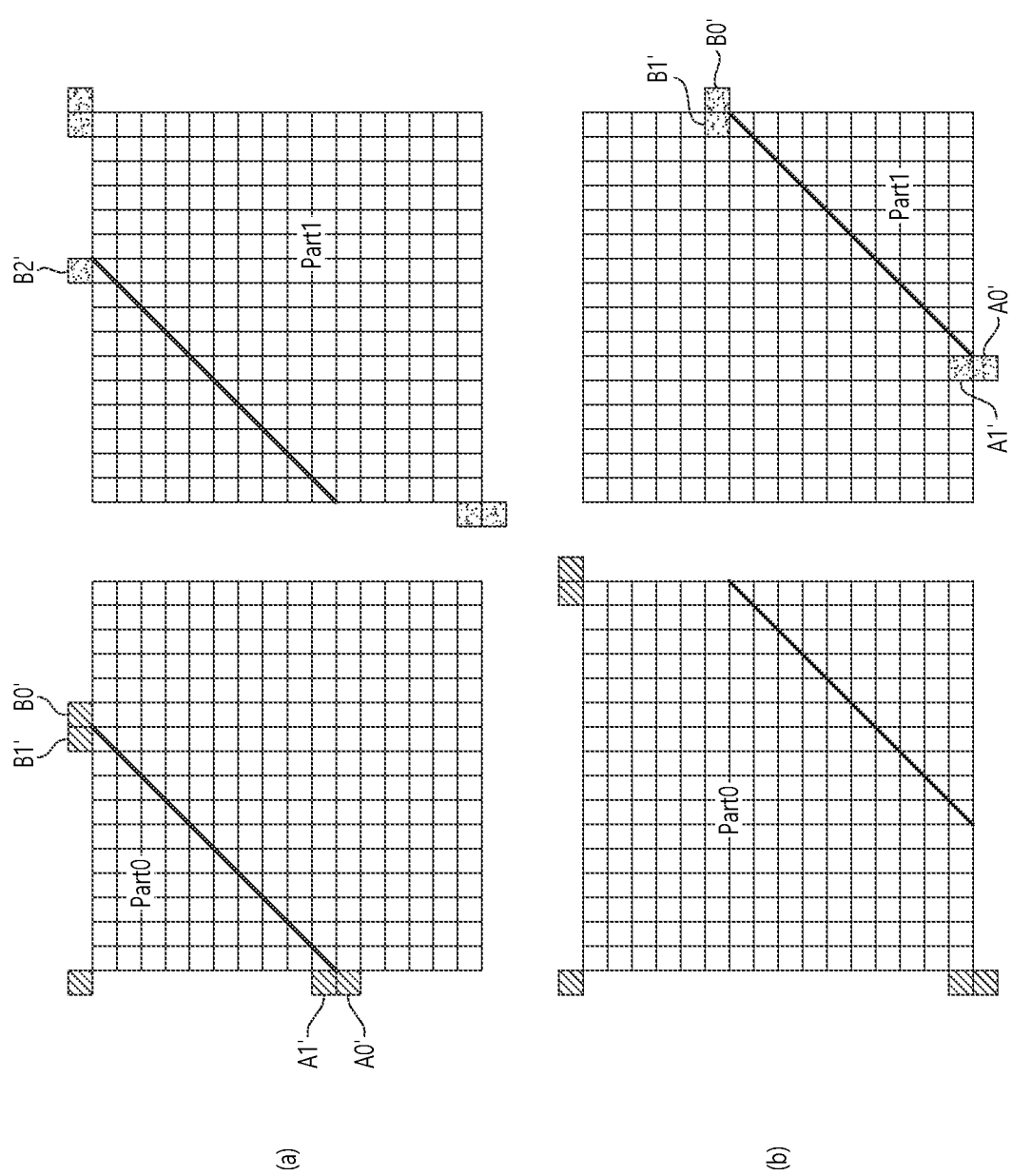
FIGS. 7A to 7C exemplarily illustrate types of blocks split through a GP structure and locations of neighboring blocks used for motion vector prediction of the blocks in each type.
Figure 7B:
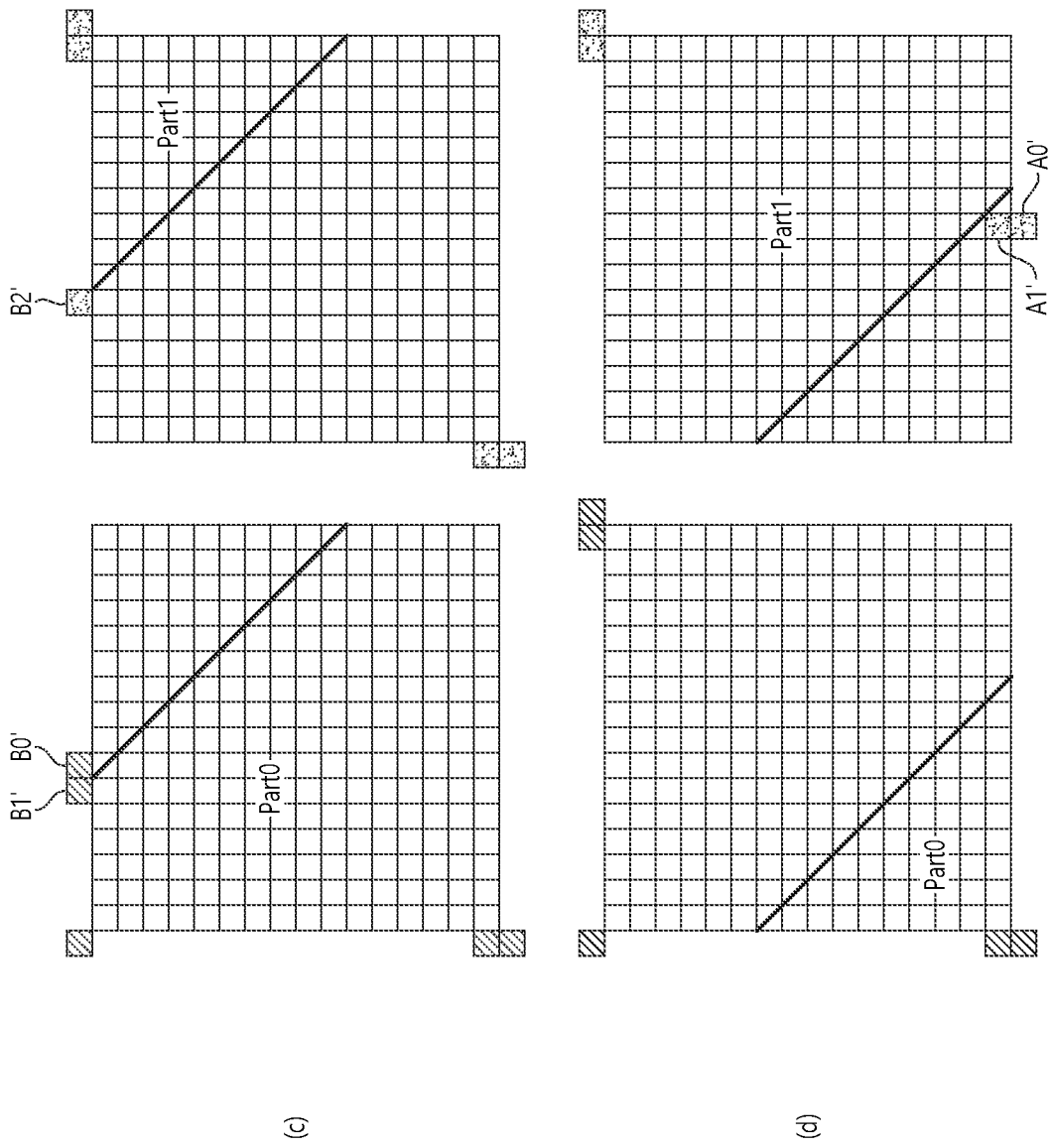
Figure 7C:
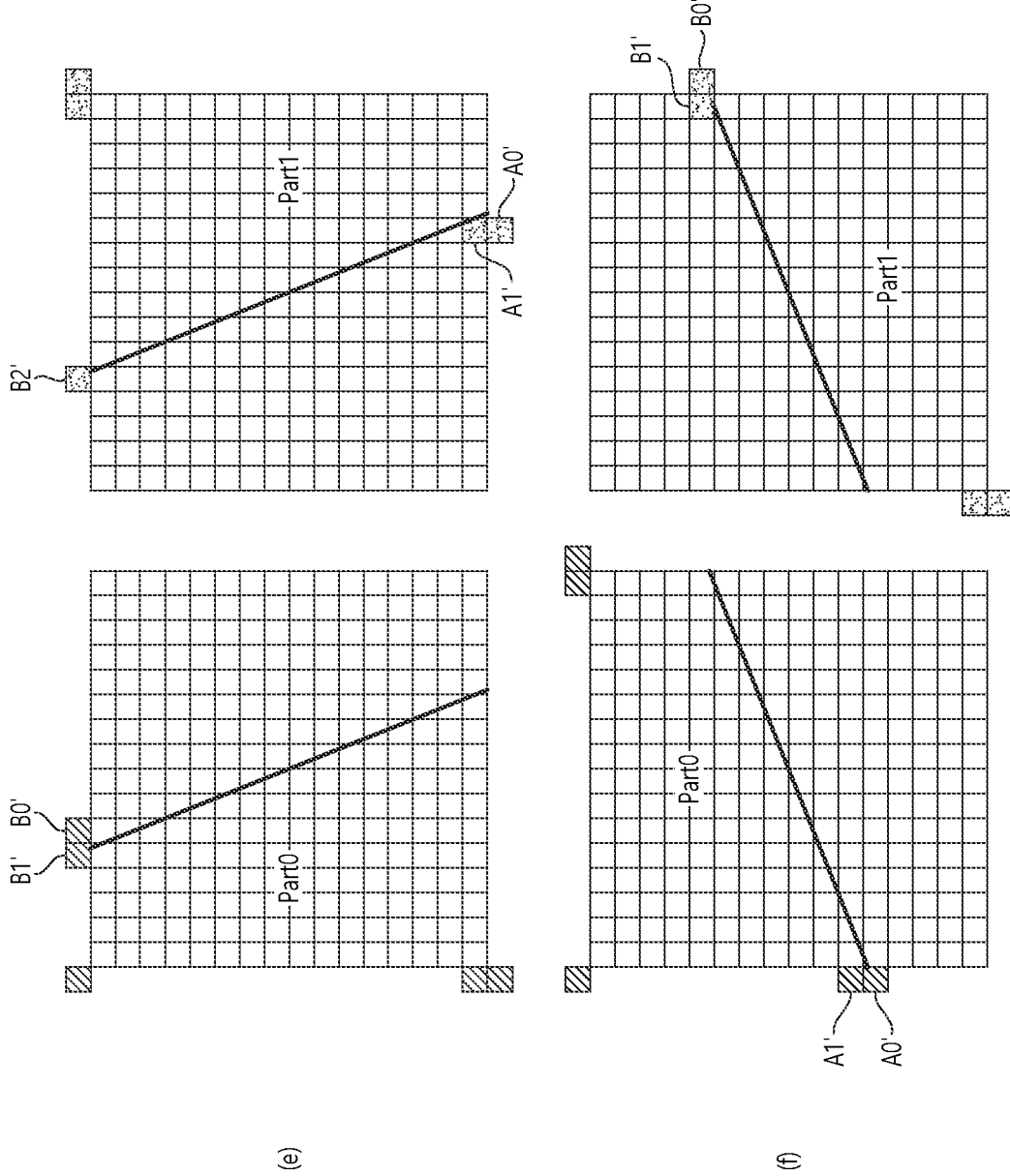

FIGS. 7A to 7C exemplarily illustrate types of blocks split through a GP structure and locations of neighboring blocks used for motion vector prediction of the blocks in each type. Referring to FIGS. 7A to 7C, the target block may be split into a first sub-block and a second sub-block through the GP structure. Here, the first sub-block may represent a block positioned at a left side among the blocks split from the target block and the second sub-block may represent a block positioned at a right side among the blocks split from the target block. Further, types of the GP structure may be classified into six first to sixth types.

For example, FIG. 7A(a) may illustrate the first type. As illustrated in FIG. 7A(a), the first type may represent a type in which the first sub-block has a triangular shape and is split to include a top-left sample of the target block. When the target block is split into the first type, the first sub-block may not be adjacent to a lower left neighboring block and a left neighboring block of an existing location. Accordingly, motion information of neighboring blocks A0' and/or A1' at a location adjacent to the first sub-block instead of the bottom-left neighboring block and the left neighboring block of the existing location may be used as a motion information candidate for predicting the first sub-block. As illustrated in FIG. 7A(a), the neighboring blocks A0' and/or A1' may be positioned approximately at the middle of a left boundary of the target block. For example, when a left height of the first sub-block is LH, and any x component of a top-left sample position of the first sub-block is 0 and a y component is 0, the location of the neighboring block A0' of the first sub-block may be derived as (−1, LH), and the location of the neighboring block A1' of the first sub-block may be derived as (−1, LH−1). Alternatively, when the left height of the first sub-block is LH, and the x component of the top-left sample position of the target block is 0 and the y component is 0, the location of the neighboring block A0' of the first sub-block may be derived as (−1, LH) and the location of the neighboring block A1' of the first sub-block may be derived as (−1, LH−1).

Further, when the target block is split into the first type, the first sub-block may not be adjacent to the top-left neighboring block and an upper neighboring block of the existing location. Accordingly, motion information of neighboring block B0' and/or B1' at a location adjacent to the first sub-block instead of the top-right neighboring block and the upper neighboring block of the existing location may be used as the motion information candidate for predicting the first sub-block. As illustrated in FIG. 7A(a), the neighboring blocks B0' and/or B1' may be positioned approximately at the middle of an upper boundary of the target block. For example, when an upper width of the first sub-block is UW, and the x component of the top-left sample position of the first sub-block is 0 and the y component is 0, the location of the neighboring block B0' of the first sub-block may be derived as (UW, −1) and the location of the neighboring block B1' of the first sub-block may be derived as (UW−1, −1). Alternatively, when the upper width of the first sub-block is UW, and the x component of the top-left sample position of the target block is 0 and the y component is 0, the location of the neighboring block B0' of the first sub-block may be derived as (UW, −1) and the location of the neighboring block B1' of the first sub-block may be derived as (UW−1, −1).

Further, when the target block is split into the first type, the second sub-block may not be adjacent to the top-left neighboring block of the existing location. Accordingly, motion information of neighboring block B2' at a location adjacent to the second sub-block instead of the top-left neighboring block of the existing location may be used as a motion information candidate for predicting the second sub-block. As illustrated in FIG. 7A(a), the neighboring block B2' may be positioned approximately at the middle of the upper boundary of the target block. For example, when the upper width of the second sub-block is UW, and the x component of the top-left sample position of the second sub-block is 0 and the y component is 0, the location of the neighboring block B2' of the second sub-block may be derived as (−1, −1). Alternatively, when the upper width of the second sub-block is UW, the size of the target block is N×N, and the x component of the top-left sample position of the target block is 0 and the y component is 0, the location of the neighboring block B2' of the second sub-block may be derived as (N−UW−1, −1).

Further, motion information candidates for the first sub-blocks and the second sub-blocks of types 2 to 6 may be derived similarly to the motion information candidates of the first sub-blocks and the second sub-blocks of type 1 described above.

For example, FIG. 7A(b) may illustrate the second type. As illustrated in FIG. 7A(b), the second type may represent a type in which the second sub-block has the triangular shape and is split to include a bottom-right sample of the target block. When the target block is split into the second type, the second sub-block may not be adjacent to the bottom-left neighboring block and the left neighboring block of the existing location. Accordingly, motion information of neighboring block A0' and/or A1' at a location adjacent to the second sub-block instead of the bottom-left neighboring block and the left neighboring block of the existing location may be used as the motion information candidate for predicting the second sub-block. As illustrated in FIG. 7A(b), the neighboring block A0' and/or A1' may be positioned approximately at the middle of a lower boundary of the target block. For example, when a lower width of the second sub-block is DW and a right height of the second sub-block is RH, and the x component of the top-left sample position of the second sub-block is 0 and the y component is 0, the location of the neighboring block A0' of the second sub-block may be derived as (−DW, RH) and the location of the neighboring block A1' of the second sub-block may be derived as (−DW, RH−1). Alternatively, when the lower width of the second sub-block is DW and the size of the target block is N×N, and the x component of the top-left sample position of the target block is 0 and the y component is 0, the location of the neighboring block A0' of the second sub-block may be derived as (N−1−DW, N) and the location of the neighboring block A1' of the first sub-block may be derived as (N−1−DW, N−1).

Further, when the target block is split into the second type, the second sub-block may not be adjacent to the top-right neighboring block and the upper neighboring block of the existing location. Accordingly, motion information of neighboring B0' and/or B1' at a location adjacent to the second sub-block instead of the top-right neighboring block and the upper neighboring block of the existing location may be used as the motion information candidate for predicting the second sub-block. As illustrated in FIG. 7A(b), the neighboring block B0' and/or B1' may be positioned approximately at the middle of a right boundary of the target block. For example, when the x component of the top-left sample position of the second sub-block is 0 and the y component is 0, the location of the neighboring block B0' of the second sub-block may be derived as (1, −1) and the location of the neighboring block B1' of the second sub-block may be derived as (0, −1). Alternatively, when the right height of the second sub-block is RH and the size of the target block is N×N, and the x component of the top-left sample position of the target block is 0 and the y component is 0, the location of the neighboring block B0' of the second sub-block may be derived as (N, N−1−RH) and the location of the neighboring block B1' of the second sub-block may be derived as (N−1, N−1−RH).

As another example, FIG. 7B(c) may illustrate the third type. As illustrated in FIG. 7B(c), the third type may represent a type in which the second sub-block has the triangular shape and is split to include the top-right sample of the target block. When the target block is split into the third type, the first sub-block may not be adjacent to the top-right neighboring block and the upper neighboring block of the existing location. Accordingly, motion information of neighboring B0' and/or B1' at a location adjacent to the first sub-block instead of the top-right neighboring block and the upper neighboring block of the existing location may be used as the motion information candidate for predicting the first sub-block. As illustrated in FIG. 7B(c), the neighboring block B0' and/or B1' may be positioned approximately at the middle of the upper boundary of the target block. For example, when the upper width of the first sub-block is UW, and the x component of the top-left sample position of the first sub-block is 0 and the y component is 0, the location of the neighboring block B0' of the first sub-block may be derived as (UW, −1) and the location of the neighboring block B1' of the first sub-block may be derived as (UW−1, −1). Alternatively, when the upper width of the first sub-block is UW, and the x component of the top-left sample position of the target block is 0 and the y component is 0, the location of the neighboring block B0' of the first sub-block may be derived as (UW, −1) and the location of the neighboring block B1' of the first sub-block may be derived as (UW−1, −1).

Further, when the target block is split into the third type, the second sub-block may not be adjacent to the top-left neighboring block of the existing location. Accordingly, motion information of neighboring block B2' at a location adjacent to the second sub-block instead of the top-left neighboring block of the existing location may be used as a motion information candidate for predicting the second sub-block. As illustrated in FIG. 7B(c), the neighboring block B2' may be positioned approximately at the middle of the upper boundary of the target block. For example, when the x component of the top-left sample position of the second sub-block is 0 and the y component is 0, the location of the neighboring block B2' of the second sub-block may be derived as (−1, −1). Alternatively, when the upper width of the second sub-block is UW and the size of the target block is N×N, and the x component of the top-left sample position of the target block is 0 and the y component is 0, the location of the neighboring block B2' of the second sub-block may be derived as (N−1−UW, −1).

As another example, FIG. 7B(d) may illustrate a fourth type. As illustrated in FIG. 7B(d), the fourth type may represent a type in which the first sub-block has the triangular shape and is split to include the bottom-left sample of the target block. When the target block is split into the fourth type, the second sub-block may not be adjacent to the bottom-left neighboring block and the left neighboring block of the existing location. Accordingly, motion information of neighboring block A0' and/or A1' at a location adjacent to the second sub-block instead of the bottom-left neighboring block and the left neighboring block of the existing location may be used as the motion information candidate for predicting the second sub-block. As illustrated in FIG. 7B(d), the neighboring block A0' and/or A1' may be positioned approximately at the middle of the lower boundary of the target block. For example, when the upper width of the second sub-block is UW, the lower width of the second sub-block is DW, and the right height of the second sub-block is RH, and the x component of the top-left sample position of the second sub-block is 0 and the y component is 0, the location of the neighboring block A0' of the second sub-block may be derived as (UW−1−DW, RH) and the location of the neighboring block A1' of the second sub-block may be derived as (UW−1−DW, RH−1). Alternatively, when the lower width of the second sub-block is DW and the size of the target block is N×N, and the x component of the top-left sample position of the target block is 0 and the y component is 0, the location of the neighboring block A0' of the second sub-block may be derived as (N−1−DW, N) and the location of the neighboring block A1' of the second sub-block may be derived as (N−1−DW, N−1).

As another example, FIG. 7C(e) may illustrate a fifth type. As illustrated in FIG. 7C(e), the fifth type may represent a type in which the first sub-block and the second sub-block have a rectangular shape and the left boundary of the first sub-block and the right height of the second sub-block are split to be the same as the height of the target block. Alternatively, the fifth type may represent a type in which the split boundary of the target block is split to be in contact with the upper boundary and the lower boundary of the target block.

When the target block is split into the fifth type, the first sub-block may not be adjacent to the top-right neighboring block and the upper neighboring block of the existing location. Accordingly, motion information of neighboring B0' and/or B1' at a location adjacent to the first sub-block instead of the top-right neighboring block and the upper neighboring block of the existing location may be used as the motion information candidate for predicting the first sub-block. As illustrated in FIG. 7C(e), the neighboring block B0' and/or B1' may be positioned approximately at the middle of the upper boundary of the target block. For example, when the upper width of the first sub-block is UW, and the x component of the top-left sample position of the first sub-block is 0 and the y component is 0, the location of the neighboring block B0' of the first sub-block may be derived as (UW, −1) and the location of the neighboring block B1' of the first sub-block may be derived as (UW−1, −1). Alternatively, when the upper width of the first sub-block is UW, and the x component of the top-left sample position of the target block is 0 and the y component is 0, the location of the neighboring block B0' of the first sub-block may be derived as (UW, −1) and the location of the neighboring block B1' of the first sub-block may be derived as (UW−1, −1).

Further, when the target block is split into the fifth type, the second sub-block may not be adjacent to the bottom-left neighboring block and the left neighboring block of the existing location. Accordingly, motion information of neighboring block A0' and/or A1' at a location adjacent to the second sub-block instead of the bottom-left neighboring block and the left neighboring block of the existing location may be used as the motion information candidate for predicting the second sub-block. As illustrated in FIG. 7C(e), the neighboring block A0' and/or A1' may be positioned approximately at the middle of the lower boundary of the target block. For example, when the upper width of the second sub-block is UW, the lower width of the second sub-block is DW, and the right height of the second sub-block is RH, and the x component of the top-left sample position of the second sub-block is 0 and the y component is 0, the location of the neighboring block A0' of the second sub-block may be derived as (UW−1−DW, RH) and the location of the neighboring block A1' of the second sub-block may be derived as (UW−1−DW, RH−1). Alternatively, when the lower width of the second sub-block is DW and the size of the target block is N×N, and the x component of the top-left sample position of the target block is 0 and the y component is 0, the location of the neighboring block A0' of the second sub-block may be derived as (N−1−DW, N) and the location of the neighboring block A1' of the second sub-block may be derived as (N−1−DW, N−1).

Further, when the target block is split into the fifth type, the second sub-block may not be adjacent to the top-left neighboring block of the existing location. Accordingly, motion information of neighboring block B2' at a location adjacent to the second sub-block instead of the top-left neighboring block of the existing location may be used as a motion information candidate for predicting the second sub-block. As illustrated in FIG. 7C(e), the neighboring block B2' may be positioned approximately at the middle of the upper boundary of the target block. For example, when the x component of the top-left sample position of the second sub-block is 0 and the y component is 0, the location of the neighboring block B2' of the second sub-block may be derived as (−1, −1). Alternatively, when the upper width of the second sub-block is UW and the size of the target block is N×N, and the x component of the top-left sample position of the target block is 0 and the y component is 0, the location of the neighboring block B2' of the second sub-block may be derived as (N−1−UW, −1).

As another example, FIG. 7C(f) may illustrate a sixth type. As illustrated in FIG. 7C(f), the sixth type may represent a type in which the first sub-block and the second sub-block have a rectangular shape and the upper boundary of the first sub-block and the lower width of the second sub-block are split to be the same as the width of the target block. Alternatively, the sixth type may represent a type in which the split boundary of the target block is split to be in contact with the left boundary and the right boundary of the target block.

When the target block is split into the sixth type, the first sub-block may not be adjacent to the bottom-left neighboring block and the left neighboring block of the existing location. Accordingly, motion information of neighboring A0' and/or A1' at a location adjacent to the first sub-block instead of the bottom-left neighboring block and the left neighboring block of the existing location may be used as a motion information candidate for predicting the first sub-block. As illustrated in FIG. 7C(f), the neighboring block A0' and/or A1' may be positioned approximately at the middle of the left boundary of the target block. For example, when a left height of the first sub-block is LH and an x component of a top-left sample position of the first sub-block 0 and a y component is 0, the location of the neighboring block A0' of the first sub-block may be derived as (−1, LH) and the location of the neighboring block A1' of the first sub-block may be derived as (−1, LH−1). Alternatively, when the left height of the first sub-block is LH and the x component of the top-left sample position of the target block is 0 and the y component is 0, the location of the neighboring block A0' of the first sub-block may be derived as (−1, LH) and the location of the neighboring block A1' of the first sub-block may be derived as (−1, LH−1).

Further, when the target block is split into the sixth type, the second sub-block may not be adjacent to the top-right neighboring block and the upper neighboring block of the existing location. Accordingly, motion information of neighboring B0' and/or B1' at a location adjacent to the second sub-block instead of the top-right neighboring block and the upper neighboring block of the existing location may be used as the motion information candidate for predicting the second sub-block. As illustrated in FIG. 7C(f), the neighboring block B0' and/or B1' may be positioned approximately at the middle of the left boundary of the target block. For example, when the lower width of the second sub-block is DW, the left height of the second sub-block is LH, and the right height of the second sub-block is RH, and the x component of the top-left sample position of the second sub-block is 0 and the y component is 0, the location of the neighboring block B0' of the second sub-block may be derived as (DW, LH−1−RH) and the location of the neighboring block B1' of the second sub-block may be derived as (DW−1, LH−1−RH). Alternatively, when the right height of the second sub-block is RH and the size of the target block is N×N, and the x component of the top-left sample position of the target block is 0 and the y component is 0, the location of the neighboring block B0' of the second sub-block may be derived as (N, N−1−RH) and the location of the neighboring block B1' of the second sub-block may be derived as (N−1, N−1−RH).

Meanwhile, the first sub-block or the second sub-block is adjacent to the neighboring block of the existing location to use the motion information of the neighboring block as the candidate or when there is no neighboring block adjacent to the first sub-block or the second sub-block which is replaceable, the motion information of the neighboring block of the existing location may be used as the motion information candidate of the first sub-block or the second sub-block.

Meanwhile, when the merge candidate list or the MVP candidate list of the target block is generated based on the motion information of the neighboring blocks of the target block as described above, the temporal motion information candidates included in the merge candidate list or the MVP candidate list may be derived based on the following temporal neighboring blocks.

Figure 8:
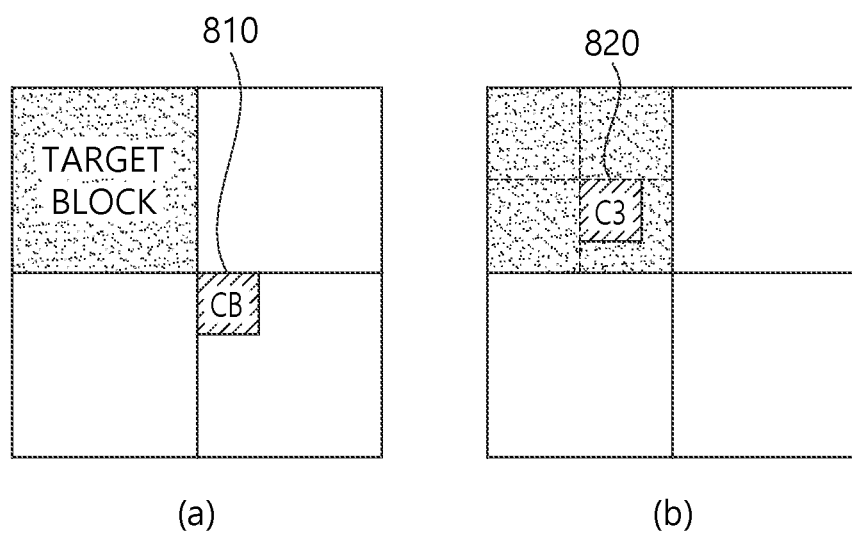
FIG. 8 exemplarily illustrates a temporal neighboring block of the target block.

FIG. 8 exemplarily illustrates a temporal neighboring block of the target block. In a legacy video coding system, the merge candidate list or MVP candidate list may be configured based on a corresponding block included in a reference picture which is a picture different from a target picture including the target block. Here, the corresponding block as a block corresponding to the target block may represent a block at a location corresponding to the target block in the reference picture.

For example, as illustrated in FIG. 8A, a block 810 at a location of a lower right neighboring block of the target block in the reference picture may be derived as the temporal neighboring block. Motion information of the temporal neighboring block may be derived as a candidate of the merge candidate list or the MVP candidate list. When the size of the target block is N×N, and the x component of the top-left sample position of the target block is 0 and the y component is 0, the location of the temporal neighboring block in the reference picture may be derived as (N, N). Here, the reference picture including the temporal neighboring block may also be represented as a co-located picture.

Alternatively, as illustrated in FIG. 8B, a block 820 at a location of a center lower right neighboring block of the target block in the reference picture may be derived as the temporal neighboring block. The motion information of the temporal neighboring block may be derived as the candidate of the merge candidate list or the MVP candidate list. When the size of the target block is N×N, and the x component of the top-left sample position of the target block is 0 and the y component is 0, the location of the temporal neighboring block in the reference picture may be derived as (N/2, N/2).

Meanwhile, when the target block is a block split through the aforementioned GP structure, the form of the block may be variously derived, and as a result, a method for deriving motion information of the target block based on a temporal neighboring block at a fixed location may not be effective. Accordingly, a method for deriving the block at the different location as the temporal neighboring block according the form of the target block split through the GP structure may be effective to more accurately derive the motion information of the target block.

Accordingly, the present disclosure proposes a method for predicting a temporal motion vector according to the form of the target block split through the GP structure. That is, the present disclosure proposes locations of temporal neighboring blocks according to the form of the target block split through the GP structure.

Figure 9A:
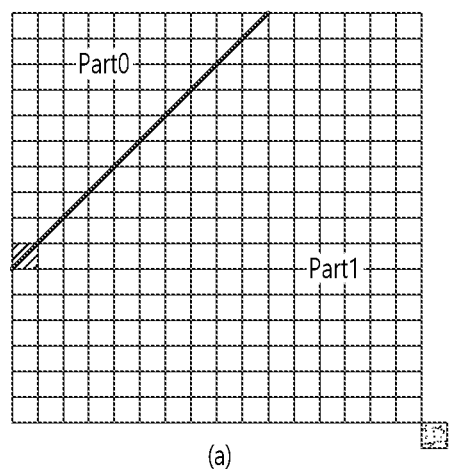
FIGS. 9A and 9B exemplarily illustrate types of blocks split through a GP structure and locations of temporal neighboring blocks used for motion vector prediction of the blocks in each type.
Figure 9A:
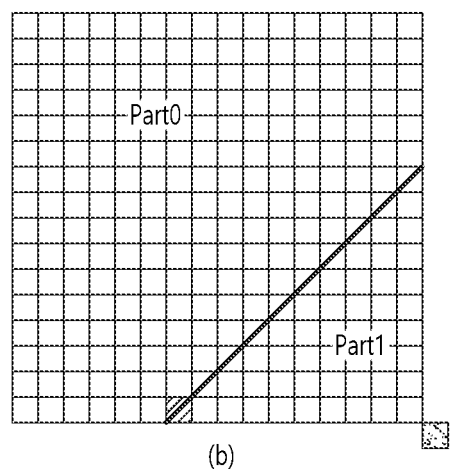
Figure 9A:
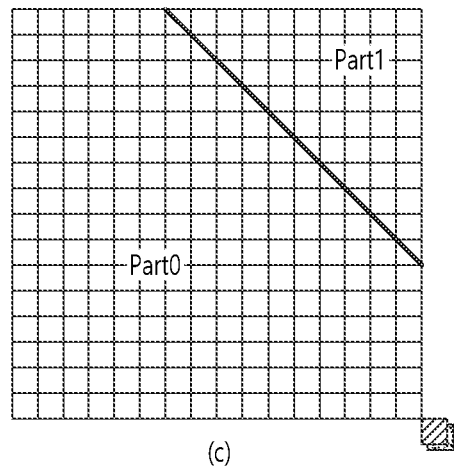
Figure 9A:
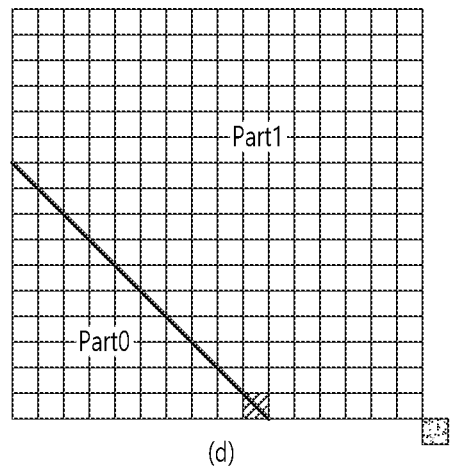
Figure 9B:
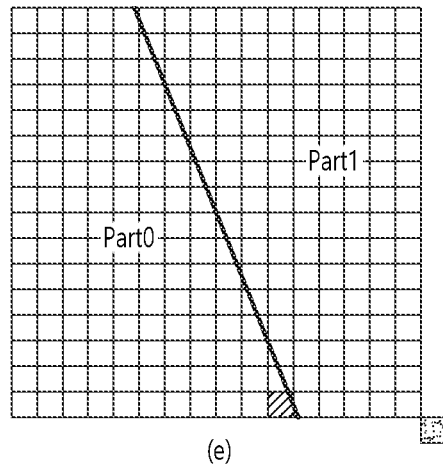
Figure 9B:
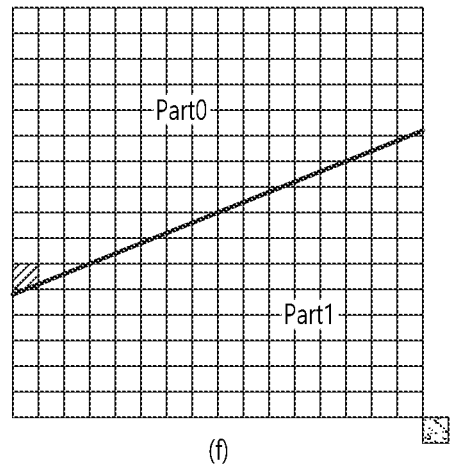

FIGS. 9A and 9B exemplarily illustrate types of blocks split through a GP structure and locations of temporal neighboring blocks in the reference picture used for motion vector prediction of the blocks in each type. Here, the reference picture including the temporal neighboring block may also be represented as a co-located picture.

Referring to FIGS. 9A and 9B, the target block may be split into a first sub-block and a second sub-block through the GP structure. Here, the first sub-block may represent a block positioned at a left side among the blocks split from the target block and the second sub-block may represent a block positioned at a right side among the blocks split from the target block. Further, types of the GP structure may be classified into six first to sixth types.

For example, FIG. 9A(a) may illustrate the first sub-block and the second sub-block of the first type. The first type may represent a type in which the first sub-block has the triangular shape and is split to include the top-left sample of the target block. Further, the first type may represent a type in which the split boundary crosses the upper boundary and the lower boundary of the target block. When the target block is split into the first type, the first sub-block may not be adjacent to a location of the top-right neighboring block of the target block. Accordingly, motion information of a corresponding block corresponding to the bottom-right neighboring block of the target block in the reference picture may not be similar to the motion information of the target block.

The motion information of the corresponding block corresponding to the bottom-right neighboring block of the first sub-block in the reference picture instead of the corresponding block corresponding to the bottom-right neighboring block of the target block in the reference picture may be used as the motion information candidate for predicting the first sub-block. That is, the block at the location of the bottom-right neighboring block of the first sub-block in the reference picture may be derived as the temporal neighboring block of the first sub-block and the motion information of the temporal neighboring block may be included as the temporal motion information candidate of the merge candidate list or the MVP candidate list. For example, when the left height of the first sub-block is LH, and the x component of the top-left sample position of the first sub-block is 0 and the y component is 0, the location of the temporal neighboring block of the first sub-block in the reference picture may be derived as (0, LH−1). The reference picture may also be represented as the co-located picture. Alternatively, when the left height of the first sub-block is LH, and the x component of the top-left sample position of the target block is 0 and the y component is 0, the location of the temporal neighboring block of the first sub-block in the reference picture may be derived as (0, LH−1).

Meanwhile, when the target block is split into the first type, the second sub-block is adjacent to the bottom-right neighboring block of the target block in the reference picture unlike the first sub-block, and as a result, the motion information of the bottom-right neighboring block of the target block in the reference picture may be used as the motion information candidate for predicting the second sub-block. That is, the block at the location of the bottom-right neighboring block of the corresponding block in the reference picture may be derived as the temporal neighboring block of the second sub-block and the motion information of the temporal neighboring block may be included as the temporal motion information candidate of the merge candidate list or the MVP candidate list. For example, when the upper width of the second sub-block is UW and the right height of the second sub-block is RH, and the x component of the top-left sample position of the second sub-block is 0 and the y component is 0, the location of the temporal neighboring block of the second sub-block in the reference picture may be derived as (UW, RH). Alternatively, when the lower width of the second sub-block is DW and the right height of the second sub-block is RH, and the x component of the top-left sample position of the target block is 0 and the y component is 0, the location of the temporal neighboring block of the second sub-block in the reference picture may be derived as (DW, RH). Alternatively, when the size of the target block is N×N, and the x component of the top-left sample position of the target block is 0 and the y component is 0, the location of the temporal neighboring block of the second sub-block in the reference picture may be derived as (N, N).

Further, temporal motion information candidates for the first sub-blocks and the second sub-blocks of types 2 to 6 may be derived similarly to the motion information candidates of the first sub-block and the second sub-block of type 1 described above.

For example, FIG. 9A(b) may illustrate the first sub-block and the second sub-block of the second type. The second type may represent a type in which the second sub-block has the triangular shape and is split to include the bottom-right sample of the target block. Further, the second type may represent a type in which the split boundary crosses the right boundary and the lower boundary of the target block. When the target block is split into the second type, the motion information of the corresponding block corresponding to the bottom-right neighboring block of the first sub-block in the reference picture instead of the corresponding block corresponding to the bottom-right neighboring block of the target block in the reference picture may be used as the motion information candidate for predicting the first sub-block. That is, the block at the location of the bottom-right neighboring block of the first sub-block in the reference picture may be derived as the temporal neighboring block of the first sub-block and the motion information of the temporal neighboring block may be included as the temporal motion information candidate of the merge candidate list or the MVP candidate list. For example, when the left height of the first sub-block is LH and the lower width of the first sub-block is DW, and the x component of the top-left sample position of the first sub-block is 0 and the y component is 0, the location of the temporal neighboring block of the first sub-block in the reference picture may be derived as (DW−1, LH−1). Alternatively, when the left height of the first sub-block is LH and the lower width of the first sub-block is DW, and the x component of the top-left sample position of the target block is 0 and the y component is 0, the location of the temporal neighboring block of the first sub-block in the reference picture may be derived as (DW−1, LH−1).

Meanwhile, when the target block is split into the second type, the second sub-block is adjacent to the bottom-right neighboring block of the target block in the reference picture unlike the first sub-block, and as a result, the motion information of the bottom-right neighboring block of the target block in the reference picture may be used as the motion information candidate for predicting the second sub-block. That is, the block at the location of the bottom-right neighboring block of the corresponding block in the reference picture may be derived as the temporal neighboring block of the second sub-block and the motion information of the temporal neighboring block may be included as the temporal motion information candidate of the merge candidate list or the MVP candidate list. For example, when the right height of the second sub-block is RH, and the x component of the top-left sample position of the second sub-block is 0 and the y component is 0, the location of the temporal neighboring block of the second sub-block in the reference picture may be derived as (0, RH). Alternatively, when the size of the target block is N×N, and the x component of the top-left sample position of the target block is 0 and the y component is 0, the location of the temporal neighboring block of the second sub-block in the reference picture may be derived as (N, N).

Further, as another example, as illustrated in FIG. 9A(c), the target block may be split into a third type. The third type may represent a type in which the second sub-block has the triangular shape and is split to include the top-right sample of the target block. Further, the third type may represent a type in which the split boundary crosses the upper boundary and the right boundary of the target block. When the target block is split into the third type, the first sub-block is adjacent to the bottom-right neighboring block of the target block in the reference picture, and as a result, the motion information of the bottom-right neighboring block of the target block in the reference picture may be used as the motion information candidate for predicting the first sub-block. That is, the block at the location of the bottom-right neighboring block of the corresponding block in the reference picture may be derived as the temporal neighboring block of the first sub-block and the motion information of the temporal neighboring block may be included as the temporal motion information candidate of the merge candidate list or the MVP candidate list. For example, when the left height of the first sub-block is LH and the lower width of the first sub-block is DW, and the x component of the top-left sample position of the first sub-block is 0 and the y component is 0, the location of the temporal neighboring block of the first sub-block in the reference picture may be derived as (DW, LH). Alternatively, when the size of the target block is N×N, and the x component of the top-left sample position of the target block is 0 and the y component is 0, the location of the temporal neighboring block of the first sub-block in the reference picture may be derived as (N, N).

Further, when the target block is split into the third type, the motion information of the corresponding block corresponding to the bottom-right neighboring block of the second sub-block in the reference picture instead of the corresponding block corresponding to the bottom-right neighboring block of the target block in the reference picture may be used as the motion information candidate for predicting the second sub-block. That is, the block at the location of the bottom-right neighboring block of the second sub-block in the reference picture may be derived as the temporal neighboring block of the second sub-block and the motion information of the temporal neighboring block may be included as the temporal motion information candidate of the merge candidate list or the MVP candidate list. For example, although not illustrated in the figure, when the upper height of the second sub-block is RH and the upper width of the second sub-block is UW, and the x component of the top-left sample position of the second sub-block is 0 and the y component is 0, the location of the temporal neighboring block of the second sub-block in the reference picture may be derived as (UW−1, RH−1). Alternatively, when the size of the target block is N×N, the right height of the second sub-block is RH, and the x component of the top-left sample position of the target block is 0 and the y component is 0, the location of the temporal neighboring block of the second sub-block in the reference picture may be derived as (N−1, RH−1). Alternatively, the temporal neighboring block of the target block may be used as the temporal neighboring block of the second sub-block. For example, when the size of the target block is N×N, and the x component of the top-left sample position of the target block is 0 and the y component is 0, the location of the temporal neighboring block of the second sub-block in the reference picture may be derived as (N, N) as illustrated in FIG. 9A(c).

Further, as another example, as illustrated in FIG. 9A(d), the target block may be split into a fourth type. The fourth type may represent a type in which the first sub-block has the triangular shape and is split to include the bottom-left sample of the target block. Further, the fourth type may represent a type in which the split boundary crosses the left boundary and the lower boundary of the target block. When the target block is split into the fourth type, the motion information of the corresponding block corresponding to the bottom-right neighboring block of the first sub-block in the reference picture instead of the corresponding block corresponding to the bottom-right neighboring block of the target block in the reference picture may be used as the motion information candidate for predicting the first sub-block. That is, the block at the location of the bottom-right neighboring block of the first sub-block in the reference picture may be derived as the temporal neighboring block of the first sub-block and the motion information of the temporal neighboring block may be included as the temporal motion information candidate of the merge candidate list or the MVP candidate list. For example, when the left height of the first sub-block is LH and the lower width of the first sub-block is DW, and the x component of the top-left sample position of the first sub-block is 0 and the y component is 0, the location of the temporal neighboring block of the first sub-block in the reference picture may be derived as (DW−1, LH−1). Alternatively, when the lower width of the first sub-block is DW and the size of the target block is N×N, and the x component of the top-left sample position of the target block is 0 and the y component is 0, the location of the temporal neighboring block of the first sub-block in the reference picture may be derived as (DW−1, N−1).

Meanwhile, when the target block is split into the fourth type, the second sub-block is adjacent to the bottom-right neighboring block of the target block in the reference picture unlike the first sub-block, and as a result, the motion information of the bottom-right neighboring block of the target block in the reference picture may be used as the motion information candidate for predicting the second sub-block. That is, the block at the location of the bottom-right neighboring block of the corresponding block in the reference picture may be derived as the temporal neighboring block of the second sub-block and the motion information of the temporal neighboring block may be included as the temporal motion information candidate of the merge candidate list or the MVP candidate list. For example, when the right height of the second sub-block is RH and the upper width of the second sub-block is UW, and the x component of the top-left sample position of the second sub-block is 0 and the y component is 0, the location of the temporal neighboring block of the second sub-block in the reference picture may be derived as (UW, RH). Alternatively, when the upper height of the second sub-block is RH and the upper width of the second sub-block is UW, and the x component of the top-left sample position of the target block is 0 and the y component is 0, the location of the temporal neighboring block of the second sub-block in the reference picture may be derived as (UW, RH). Alternatively, when the size of the target block is N×N, and the x component of the top-left sample position of the target block is 0 and the y component is 0, the location of the second sub-block in the reference picture may be derived as (N, N).

Further, as another example, as illustrated in FIG. 9B(e), the target block may be split into a fifth type. The fifth type may represent a type in which the first sub-block and the second sub-block have a rectangular shape and the left boundary of the first sub-block and the right height of the second sub-block are split to be the same as the height of the target block. Alternatively, the fifth type may represent a type in which the split boundary of the target block is split to be in contact with the upper boundary and the lower boundary of the target block.

When the target block is split into the fifth type, the motion information of the corresponding block corresponding to the bottom-right neighboring block of the first sub-block in the reference picture instead of the corresponding block corresponding to the bottom-right neighboring block of the target block in the reference picture may be used as the motion information candidate for predicting the first sub-block. That is, the block at the location of the bottom-right neighboring block of the first sub-block in the reference picture may be derived as the temporal neighboring block of the first sub-block and the motion information of the temporal neighboring block may be included as the temporal motion information candidate of the merge candidate list or the MVP candidate list. For example, when the left height of the first sub-block is LH and the lower width of the first sub-block is DW, and the x component of the top-left sample position of the first sub-block is 0 and the y component is 0, the location of the temporal neighboring block of the first sub-block in the reference picture may be derived as (DW−1, LH−1). Alternatively, when the lower width of the first sub-block is DW and the size of the target block is N×N, and the x component of the top-left sample position of the target block is 0 and the y component is 0, the location of the temporal neighboring block of the first sub-block in the reference picture may be derived as (DW−1, N−1).

Meanwhile, when the target block is split into the fifth type, the second sub-block is adjacent to the bottom-right neighboring block of the target block in the reference picture unlike the first sub-block, and as a result, the motion information of the bottom-right neighboring block of the target block in the reference picture may be used as the motion information candidate for predicting the second sub-block. That is, the block at the location of the bottom-right neighboring block of the corresponding block in the reference picture may be derived as the temporal neighboring block of the second sub-block and the motion information of the temporal neighboring block may be included as the temporal motion information candidate of the merge candidate list or the MVP candidate list. For example, when the right height of the second sub-block is RH and the upper width of the second sub-block is UW, and the x component of the top-left sample position of the second sub-block is 0 and the y component is 0, the location of the temporal neighboring block of the second sub-block in the reference picture may be derived as (UW, RH). Alternatively, when the right height of the second sub-block is RH, the size of the target block is N×N, and the x component of the top-left sample position of the target block is 0 and the y component is 0, the location of the temporal neighboring block of the second sub-block in the reference picture may be derived as (N, RH). Alternatively, when the size of the target block is N×N, and the x component of the top-left sample position of the target block is 0 and the y component is 0, the location of the second sub-block in the reference picture may be derived as (N, N).

Further, as another example, as illustrated in FIG. 9B(f), the target block may be split into a sixth type. The sixth type may represent a type in which the first sub-block and the second sub-block have the rectangular shape and the upper boundary of the first sub-block and the lower width of the second sub-block are split to be the same as the width of the target block. Alternatively, the sixth type may represent a type in which the split boundary of the target block is split to be in contact with the left boundary and the right boundary of the target block.

When the target block is split into the sixth type, the motion information of the corresponding block corresponding to the bottom-right neighboring block of the first sub-block in the reference picture instead of the corresponding block corresponding to the bottom-right neighboring block of the target block in the reference picture may be used as the motion information candidate for predicting the first sub-block. That is, the block at the location of the bottom-right neighboring block of the first sub-block in the reference picture may be derived as the temporal neighboring block of the first sub-block and the motion information of the temporal neighboring block may be included as the temporal motion information candidate of the merge candidate list or the MVP candidate list. For example, when the left height of the first sub-block is LH, and the x component of the top-left sample position of the first sub-block is 0 and the y component is 0, the location of the temporal neighboring block of the first sub-block in the reference picture may be derived as (0, LH−1). Alternatively, when the left height of the first sub-block is LH, and the x component of the top-left sample position of the target block is 0 and the y component is 0, the location of the temporal neighboring block of the first sub-block in the reference picture may be derived as (0, LH−1).

Meanwhile, when the target block is split into the sixth type, the second sub-block is adjacent to the bottom-right neighboring block of the target block in the reference picture unlike the first sub-block, and as a result, the motion information of the bottom-right neighboring block of the target block in the reference picture may be used as the motion information candidate for predicting the second sub-block. That is, the block at the location of the bottom-right neighboring block of the corresponding block in the reference picture may be derived as the temporal neighboring block of the second sub-block and the motion information of the temporal neighboring block may be included as the temporal motion information candidate of the merge candidate list or the MVP candidate list. For example, when the right height of the second sub-block is RH, and the x component of the top-left sample position of the second sub-block is 0 and the y component is 0, the location of the temporal neighboring block of the second sub-block in the reference picture may be derived as (0, RH). Alternatively, when the size of the target block is N×N, and the x component of the top-left sample position of the target block is 0 and the y component is 0, the location of the second sub-block in the reference picture may be derived as (N, N).

Meanwhile, when the target block is split through the GP structure as described above, discontinuity between the first sub-block and the second sub-block of the target block may occur. That is, prediction of each of the first sub-block and the second sub-block may be separately performed, and as a result, a problem that the boundary between the first sub-block and the second sub-block is shown may occur. The present disclosure proposes a method for performing overlapped motion compensation between the first sub-block and the second sub-block in order to remove the discontinuity between the first sub-block and the second sub-block split through the GP structure.

Figure 10:
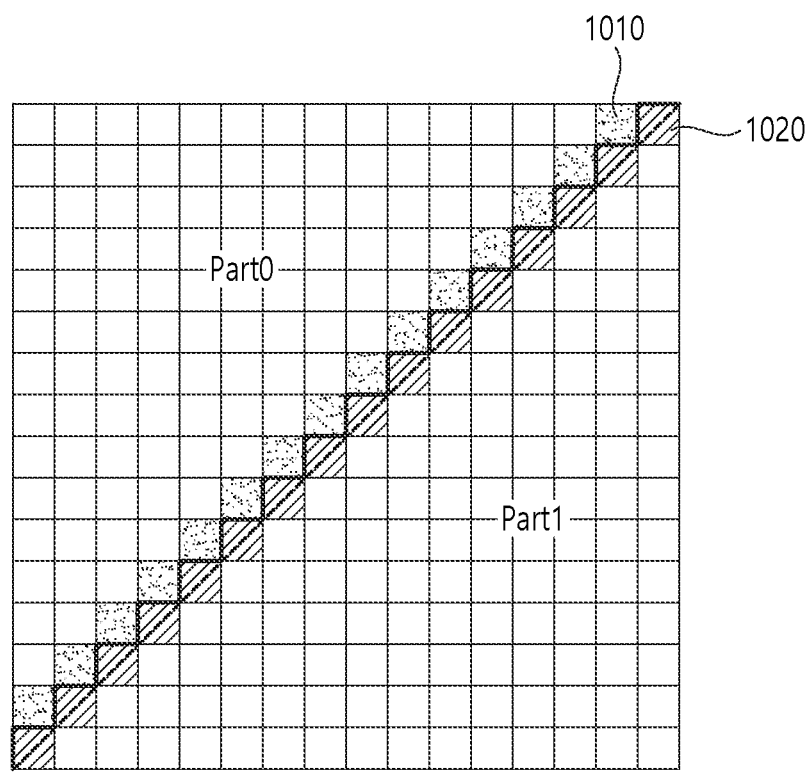
FIG. 10 exemplarily illustrates a boundary region between a first sub-block and a second sub-block split through the GP structure.

FIG. 10 exemplarily illustrates a boundary region between a first sub-block and a second sub-block split through the GP structure. Referring to FIG. 10, the target block may be split into the first sub-block and the second sub-block through the GP structure. In other words, the target block may be split into the first sub-block and the second sub-block based on the split boundary. In this case, a boundary region 1010 of the first sub-block may represent a region which is included in the first sub-block and is adjacent to the second sub-block. Further, a boundary region 1020 of the second sub-block may represent a region which is included in the second sub-block and is adjacent to the first sub-block. The overlapped motion compensation may be performed for samples of the boundary region of the first sub-block and the boundary region of the second sub-block. That is, the boundary region of the first sub-block and the boundary region of the second sub-block may be derived as a region in which the overlapped motion compensation is performed.

Figure 11:
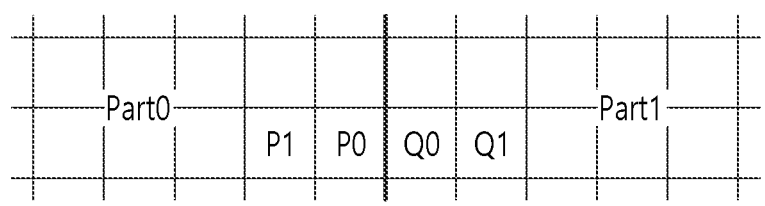
FIG. 11 exemplarily illustrates samples for which filtering for overlapped motion compensation is performed.

FIG. 11 may exemplarily illustrate samples for which filtering for overlapped motion compensation is performed. P0 and P1 illustrated in FIG. 11 may represent samples included in the boundary region of the first sub-block and Q0 and Q1 may represent samples included in the boundary region of the second sub-block. In this case, filtering may be performed for the P0 and/or the P1 for the overlapped motion compensation. Alternatively, filtering may be performed for the Q0 and/or the Q1 for the overlapped motion compensation. In other words, in order to remove the discontinuity between the first sub-block and the second sub-block, filtering may be performed for the P0 and/or the P1 or filtering may be performed for the Q0 and/or the Q1.

For example, the filtering may be performed for a sample adjacent to the second sub-block among the samples of the first sub-block and a sample adjacent to the first sub-block among the samples of the second sub-block. That is, the filtering may be performed for the P0 and the Q0 illustrated in FIG. 11 above. Specifically, sample value 1 of the P0 may be derived based on the motion information of the first sub-block, sample value 2 of the P0 may be derived based on the motion information of the second sub-block, and a filtered sample value of the P0 may be derived based on the sample value 1 and the sample value 2 of the P0. Further, sample value 1 of the Q0 may be derived based on the motion information of the first sub-block, sample value 2 of the Q0 may be derived based on the motion information of the second sub-block, and a filtered sample value of the Q0 may be derived based on the sample value 1 and the sample value 2 of the Q0.

In this case, the filtered value of the P0 and the filtered value of the Q0 may be derived through the following equation.

$$P0=(3*P0_{Part0}+P0_{Part1})/4$$

$$Q0=(Q0_{Part0}+3*Q0_{Part1})/4 \quad \text{[Equation 1]}$$

Here, $P0_{Part0}$ may represent the sample value 1 of the P0 based on the motion information of the first sub-block, $P0_{Part1}$ may represent the sample value 2 of the P0 based on the motion information of the second sub-block, and P0 may represent the filtered sample value of the P0. Further, $Q0_{Part0}$ may represent the sample value 1 of the Q0 based on the motion information of the first sub-block, $Q0_{Part1}$ may represent the sample value 2 of the Q0 based on the motion information of the second sub-block, and Q0 may represent the filtered sample value of the Q0.

Alternatively, the value of the P0 and the filtered value of the Q0 may be derived through the following equation.

$$P0=(7*P0_{Part0}+P0_{Part1})/8$$

$$Q0=(Q0_{Part0}+7*Q0_{Part1})/8 \quad \text{[Equation 2]}$$

Here, $P0_{Part0}$ may represent the sample value 1 of the P0 based on the motion information of the first sub-block, $P0_{Part1}$ may represent the sample value 2 of the P0 based on the motion information of the second sub-block, and P0 may represent the filtered sample value of the P0. Further, $Q0_{Part0}$ may represent the sample value 1 of the Q0 based on the motion information of the first sub-block, $Q0_{Part1}$ may represent the sample value 2 of the Q0 based on the motion information of the second sub-block, and Q0 may represent the filtered sample value of the Q0.

Further, as another example, the filtering may be performed for a first sample adjacent to the second sub-block and a second sample adjacent to the left side of the first sample among the samples of the first sub-block and the filtering may be performed for a first sample adjacent to the first sub-block and a second sample adjacent to the right side of the first sample among the samples of the second sub-block. Alternatively, the filtering may be performed for the first sample adjacent to the second sub-block and the second sample adjacent to the upper side of the first sample among the samples of the first sub-block and the filtering may be performed for the first sample adjacent to the first sub-block and the second sample adjacent to the lower side of the first sample among the samples of the second sub-block. Two samples of the first sub-block around the split boundary may be included in the boundary region of the first sub-block and two samples of the second sub-block around the split boundary may be included in the boundary region of the second sub-block. In this case, the filtering may be performed for the P0 and the P1, and the Q0 and the Q1 illustrated in FIG. 11 above. Specifically, sample value 1 of the P0 may be derived based on the motion information of the first sub-block, sample value 2 of the P0 may be derived based on the motion information of the second sub-block, and a filtered sample value of the P0 may be derived based on the sample value 1 and the sample value 2 of the P0. Further, sample value 1 of the P1 may be derived based on the motion information of the first sub-block, sample value 2 of the P1 may be derived based on the motion information of the second sub-block, and a filtered sample value of the P1 may be derived based on the sample value 1 and the sample value 2 of the P1. Further, sample value 1 of the Q0 may be derived based on the motion information of the first sub-block, sample value 2 of the Q0 may be derived based on the motion information of the second sub-block, and a filtered sample value of the Q0 may be derived based on the sample value 1 and the sample value 2 of the Q0. Further, sample value 1 of the Q1 may be derived based on the motion information of the first sub-block, sample value 2 of the Q1 may be derived based on the motion information of the second sub-block, and a filtered sample value of the Q1 may be derived based on the sample value 1 and the sample value 2 of the Q1.

In this case, the filtered value of the P0, the filtered value of the P1, the filtered value of the Q0, and the filtered value of the Q1 may be derived through the following equation.

$$P0=(3*P0_{Part0}+P0_{Part1})/4$$

$$P1=(7*P1_{Part0}+P1_{Part1})/8$$

$$Q0=(Q0_{Part0}+3*Q0_{Part1})/4$$

$$Q1=(Q1_{Part0}+7*Q1_{Part1})/8 \quad \text{[Equation 3]}$$

Here, $P0_{Part0}$ may represent the sample value 1 of the P0 based on the motion information of the first sub-block, $P0_{Part1}$ may represent the sample value 2 of the P0 based on the motion information of the second sub-block, and P0 may represent the filtered sample value of the P0. Here, $P1_{Part0}$ may represent the sample value 1 of the P1 based on the motion information of the first sub-block, $P1_{Part1}$ may represent the sample value 2 of the P1 based on the motion information of the second sub-block, and P1 may represent the filtered sample value of the P1. Further, $Q0_{Part0}$ may represent the sample value 1 of the Q0 based on the motion information of the first sub-block, $Q0_{Part1}$ may represent the sample value 2 of the Q0 based on the motion information of the second sub-block, and Q0 may represents the filtered sample value of the Q0. Further, $Q1_{Part0}$ may represent the sample value 1 of the Q1 based on the motion information of the first sub-block, $Q1_{Part1}$ may represent the sample value 2 of the Q1 based on the motion information of the second sub-block, and Q1 may represents the filtered sample value of the Q1.

The number of samples around the split boundary in which the filtering is performed may be variably selected in units of slice or block. Alternatively, the number of samples around the split boundary in which the filtering is performed may be selected based on the size of the target block. For example, when the target block is a 16×16 sized block, the filtering may be applied to one sample around the split boundary among samples of a sub-block of the target block. For example, when the target block is a block larger than the 16×16 sized block, the filtering may be applied to two samples around the split boundary among the samples of the sub-block of the target block. Meanwhile, information indicating whether to apply the filtering may be transmitted in units of sequence parameter set (SPS), picture parameter set (PSP), slice, block, and the like.

Meanwhile, when the target block is split based on the GP structure, a transformation process for the target block may be performed through various methods.

As an example, a method for performing one transformation and quantization process for the first sub-block and the second sub-block may be proposed. Specifically, prediction for each of the first sub-block and the second sub-block derived by splitting the target block based on the GP structure may be performed, a residual signal for each of the first sub-block and the second sub-block may be performed, and encoded information of the first sub-block and the second sub-block derived by performing one transformation, quantization, and entropy encoding for the residual signal of the first sub-block and the residual signal of the second sub-block may be transmitted to the decoding apparatus. In other words, the encoding apparatus may perform one transformation and quantization process for the first sub-block and the second sub-block, and entropy-encode information on the first sub-block and the second sub-block generated through the transformation and quantization process and transmit the entropy-encoded information to the decoding apparatus.

Figure 12:
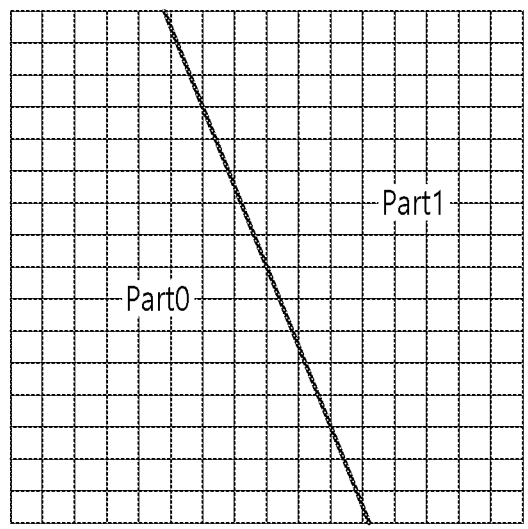
FIG. 12 illustrates an example of the first sub-block and the second sub-block for which one transform process is performed.

FIG. 12 illustrates an example of a first sub-block and a second sub-block for which one transform process is performed. Separate prediction may be performed for the first sub-block and the second sub-block. The residual signal for the first sub-block may be generated based on predicted samples of the first sub-block generated through the prediction of the first sub-block and the residual signal for the second sub-block may be generated based on predicted samples of the second sub-block generated through the prediction of the second sub-block. In this case, as illustrated in FIG. 12, the residual signal of the first sub-block and the residual signal of the second sub-block may be combined into one block and the transformation and quantization process for the combined block may be performed.

Further, as another example, a method for performing a separate transformation and quantization process for the first sub-block and the second sub-block may be proposed.

Figure 13:
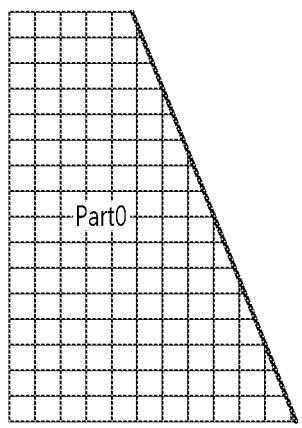
FIG. 13 illustrates an example of the first sub-block and the second sub-block for which a separate transform process is performed.
Figure 13:
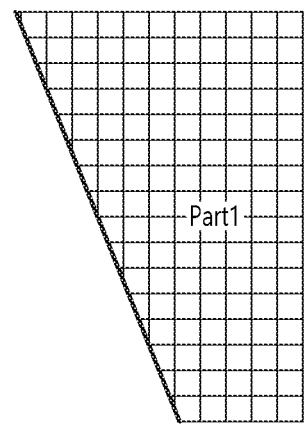
Figure 13:
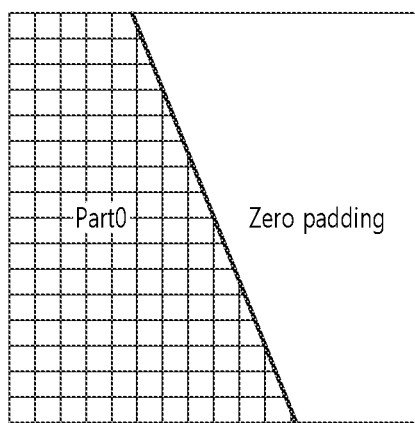
Figure 13:
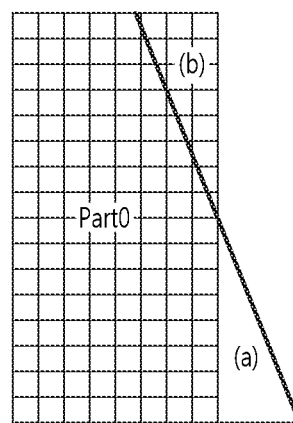

FIG. 13 illustrates an example of the first sub-block and the second sub-block for which a separate transform process is performed. FIG. 13A may illustrate the residual signal of the first sub-block which is transformed and FIG. 13B may illustrate the residual signal of the second sub-block which is transformed. Prediction for each of the first sub-block and the second sub-block derived by splitting the target block based on the GP structure may be performed, a residual signal for each of the first sub-block and the second sub-block may be performed, and encoded information of the first sub-block and encoded information of the second sub-block may be derived and transmitted to the decoding apparatus by performing one transformation, quantization, and entropy encoding for each of the residual signal of the first sub-block and the residual signal of the second sub-block. In other words, the encoding apparatus may perform the separate transformation and quantization process for each of the residual signal of the first sub-block and the residual signal of the second sub-block, and entropy-encode information on the first sub-block and the second sub-block generated through the transformation and quantization process and transmit the entropy-encoded information to the decoding apparatus.

Further, as another example, only the first sub-block of the first sub-block and the second sub-block may be transformed. That is, only the residual signal of the first sub-block may be transformed. In this case, the residual signal of the first sub-block may be transformed based on a transform kernel having a smallest size, which includes only the first sub-block. That is, the transform kernel may represent the transform kernel having the smallest size among transform kernels having sizes including the size of the first sub-block.

Alternatively, as illustrated in FIG. 13C, the residual signal of the first sub-block is transformed based on the transform kernel having the size of the target block, but a region not included in the first sub-block among the regions of the target block, i.e., the second sub-block region is filled with a value of 0 to be transformed. In other words, the second sub-block region padded with 0 is combined to the residual signal of the first sub-block to derive the block having the target block size and the derived block may be transformed based on the transform kernel having the target block size.

Alternatively, as illustrated in FIG. 13D, the residual signal of the first sub-block may be rearranged and the rearranged residual signal may be transformed. Specifically, as illustrated in FIG. 13D, a residual signal of an a region 1310 of the first sub-block may be rearranged to a b region 1320 of the first sub-block and the rearranged residual signal may be transformed. That is, the residual signal of the a region 1310 may be rearranged in the b region 1320 and the residual signal of the first sub-block may have the rectangular shape and the residual signal of the first sub-block may be transformed based on the transform kernel having the size including the first sub-block rearranged.

Figure 14:
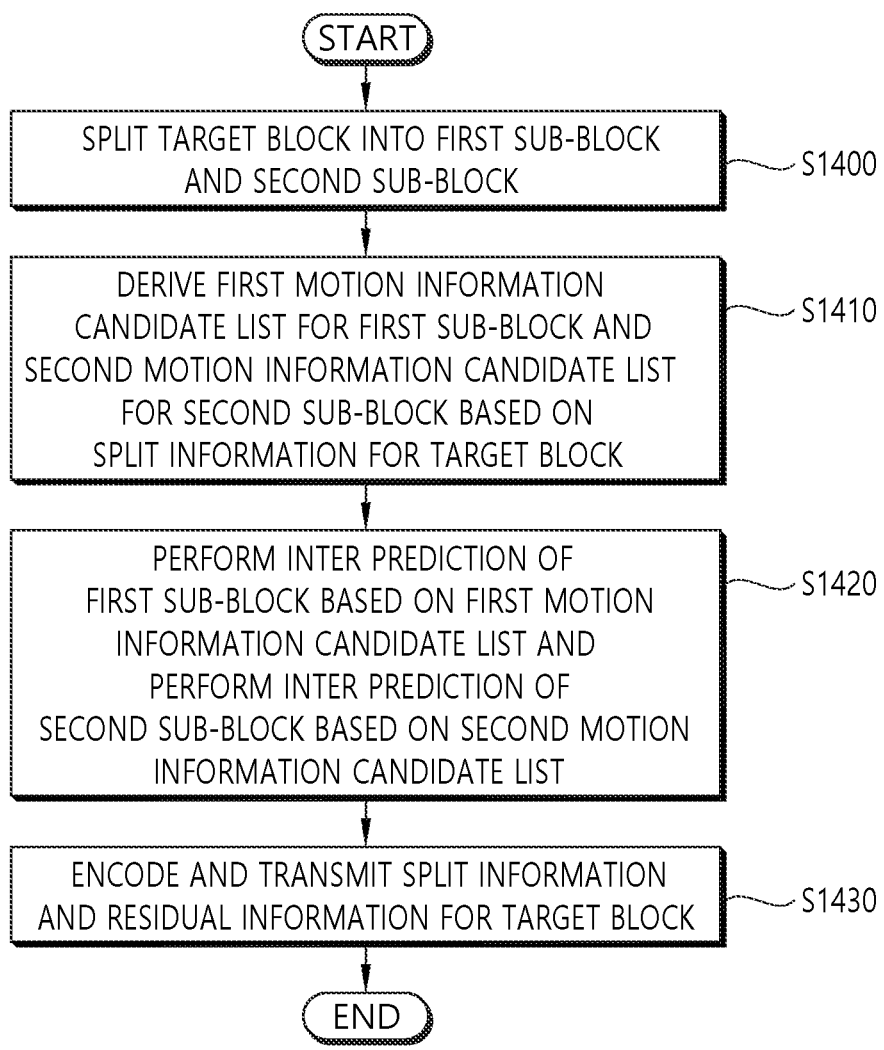
FIG. 14 schematically illustrates a video encoding method by an encoding apparatus according to the present disclosure.

FIG. 14 schematically illustrates a video encoding method by an encoding apparatus according to the present disclosure. The method disclosed in FIG. 14 may be performed by the encoding apparatus disclosed in FIG. 1. Specifically, for example, S1400 of FIG. 14 may be performed by a picture partitioner of the encoding apparatus, S1410 and S1420 may be performed by a predictor of the encoding apparatus, and S1430 may be performed by an entropy encoder of the encoding apparatus.

The encoding apparatus splits a target block into a first sub-block and a second sub-block (S1400). The target block may be a block split in a quad-tree (QT) structure and a block of a terminal node in the QT structure, which is no longer split in the QT structure. The terminal node may also be referred to as a leaf node. Here, the QT structure may represent a structure in which a 2N×2N sized target block is split into four N×N sized sub-blocks. In this case, the target block may be split in a geometry partition (GP) structure and the GP structure may represent a structure in which the target block is split into various types of sub-blocks. Further, the GP structure may represent a structure in which the target block is split based on a predetermined split boundary.

The encoding apparatus may derive the split boundary and split the target block into the first sub-block and the second sub-block based on the split boundary. In other words, the target block may be split into the first sub-block and the second sub-block through the split boundary.

In this case, the encoding apparatus may generate split information for the target block. The split information may be referred to as GP split information. The split information may include information indicating an angle of the split boundary and information indicating a distance between the split boundary and a center of the target block. Alternatively, the split information may include a GP split index indicating one of a plurality of predetermined split types. In this case, the target block may be split into the first sub-block and the second sub-block of the type indicated by the GP split index. Meanwhile, the first sub-block may represent a block positioned at a left side among the blocks split from the target block and the second sub-block may represent a block positioned at a right side among the blocks split from the target block. Further, the first sub-block and the second sub-block may be non-rectangular blocks.

Further, the split information for the target block may include a geometry partition (GP) split flag for the target block and the GP split flag may indicate whether the target block is split into sub-blocks having various forms. Alternatively, the GP split flag may indicate whether the target block is split into sub-blocks through a predetermined split boundary. When the value of the GP split flag is 1, i.e., when the GP split flag indicates that the target block is split into the sub-blocks, the target block may be split into a first sub-block and a second sub-block through a split boundary derived based on information indicating the angle of the split boundary and/or information indicating a distance between the split boundary and the center of the target block.

The encoding apparatus derives a first motion information candidate list for the first sub-block and a second motion information candidate list for the second sub-block based on the split type of the target block (S1410). The encoding apparatus may derive the first motion information candidate list and the second motion information candidate list based on the split type of the target block. That is, a spatial neighboring block and/or a temporal neighboring block of the first sub-block may be derived according to the split type and the spatial neighboring block and/or the temporal neighboring block of the second sub-block may be derived. The first motion information candidate list may include a spatial candidate indicating motion information of the spatial neighboring block of the first sub-block and/or a temporal candidate indicating motion information of the temporal neighboring block of the first sub-block. That is, the first motion information candidate list for the first sub-block may be different from the second motion information candidate list for the second sub-block. A left height or a right height of the first sub-block may be equal to or smaller than a height of the target block and an upper width or a lower width of the first sub-block may be equal to or smaller than a width of the target block. Further, the left height or right height of the second sub-block may be equal to or smaller than the height of the target block and the upper width or lower width of the second sub-block may be equal to or smaller than the width of the target block.

Meanwhile, when a merge mode is applied to the first sub-block, the first motion information candidate list may represent a merge candidate list and when a motion vector prediction (MVP) mode is applied to the first sub-block, the first motion information candidate list may represent an MVP candidate list. Further, the second motion information candidate list may include the spatial candidate indicating the motion information of the spatial neighboring block of the second sub-block and/or the temporal candidate indicating the motion information of the temporal neighboring block of the second sub-block. Meanwhile, when the merge mode is applied to the second sub-block, the second motion information candidate list may represent the merge candidate list and when the motion vector prediction (MVP) mode is applied to the second sub-block, the second motion information candidate list may represent the MVP candidate list.

Meanwhile, the split types derived based on the split information may include six first to sixth types.

For example, the first type may represent a type in which the first sub-block has the triangular shape and is split to include the top-left sample of the target block. Further, the first type may represent a type in which the split boundary crosses the upper boundary and the left boundary of the target block.

When the target block is split into the first type, i.e., the split boundary crosses the upper boundary and the left boundary of the target block, the upper width of the first sub-block is UW, the left height of the first sub-block is LH, and an x component of the top-left sample position of the first sub-block is 0 and a y component is 0, the first motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, a location of the first spatial neighboring block may be (−1, LH), the location of the second spatial neighboring block may be (−1, LH−1), the location of the third spatial neighboring block may be (UW, −1), and the location of the fourth spatial neighboring block may be (UW−1, −1). Further, the first motion information candidate list may include a temporal candidate indicating motion information of the temporal neighboring block in a co-located picture. In this case, the location of the temporal neighboring block may be (0, LH−1).

Further, when the target block is split into the first type, i.e., the split boundary crosses the upper boundary and the left boundary of the target block, the upper width of the first sub-block is UW, the left height of the first sub-block is LH, and an x component of the top-left sample position of the target block is 0 and a y component is 0, the first motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, a location of the first spatial neighboring block may be (−1, LH), the location of the second spatial neighboring block may be (−1, LH−1), the location of the third spatial neighboring block may be (UW, −1), and the location of the fourth spatial neighboring block may be (UW−1, −1). Further, the first motion information candidate list may include a temporal candidate indicating motion information of the temporal neighboring block in a co-located picture. In this case, the location of the temporal neighboring block may be (0, LH−1).

Further, when the target block is split into the first type, i.e., the split boundary crosses the upper boundary and the left boundary of the target block, the upper width of the second sub-block is UW, and the x component of the top-left sample position of the second sub-block is 0 and the y component is 0, the second motion information candidate list may include the spatial candidate indicating the motion information of the spatial neighboring block. In this case, the location of the spatial neighboring block may be (−1, −1).

Further, when the target block is split into the first type, i.e., the split boundary crosses the upper boundary and the left boundary of the target block, the upper width of the second sub-block is UW, the size of the target block is N×N, and the x component of the top-left sample position of the second sub-block is 0 and the y component is 0, the second motion information candidate list may include the spatial candidate indicating the motion information of the spatial neighboring block. In this case, the location of the spatial neighboring block may be (N−UW−1, −1).

As another example, the second type may represent a type in which the second sub-block has the triangular shape and is split to include the bottom-right sample of the target block. Further, the second type may represent a type in which the split boundary crosses the right boundary and the lower boundary of the target block.

When the target block is split into the second type, i.e., the split boundary crosses the right boundary and the lower boundary of the target block, the lower width of the second sub-block is DW, the right height of the second sub-block is RH, and the x component of the top-left sample position of the second sub-block is 0 and the y component is 0, the second motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, the location of the first spatial neighboring block may be (−DW, RH), the location of the second spatial neighboring block may be (−DW, RH−1), the location of the third spatial neighboring block may be (−1, −1), and the location of the fourth spatial neighboring block may be (0, −1). Further, the first motion information candidate list may include a temporal candidate indicating motion information of the temporal neighboring block in the co-located picture. In this case, the location of the temporal neighboring block may be (0, LH).

Further, when the target block is split into the second type, i.e., the split boundary crosses the right boundary and the lower boundary of the target block, the lower width of the second sub-block is DW, the right height of the second sub-block is RH, the size of the target block is N×N, and the x component of the top-left sample position of the target block is 0 and the y component is 0, the second motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, the location of the first spatial neighboring block may be (N−1−DW, N), the location of the second spatial neighboring block may be (N−1−DW, N−1), the location of the third spatial neighboring block may be (N, N−1−RH), and the location of the fourth spatial neighboring block may be (N−1, N−1−RH). Further, the second motion information candidate list may include a temporal candidate indicating motion information of the temporal neighboring block in the co-located picture. In this case, the location of the temporal neighboring block may be (N, N).

Further, when the target block is split into the second type, i.e., the split boundary crosses the right boundary and the lower boundary of the target block, the left height of the first sub-block is LH, the lower width of the first sub-block is DW, and the x component of the top-left sample position of the first sub-block is 0 and the y component is 0, the first motion information candidate list may include the spatial candidate indicating the motion information of the spatial neighboring block in the co-located picture. In this case, the location of the temporal neighboring block may be (DW−1, LH−1).

Further, when the target block is split into the second type, i.e., the split boundary crosses the right boundary and the lower boundary of the target block, the left height of the first sub-block is LH, the lower width of the first sub-block is DW, and the x component of the top-left sample position of the target block is 0 and the y component is 0, the first motion information candidate list may include the temporal candidate indicating the motion information of the temporal neighboring block in the co-located picture. In this case, the location of the temporal neighboring block may be (DW−1, LH−1).

As another example, the third type may represent a type in which the second sub-block has the triangular shape and is split to include the top-right sample of the target block. Further, the third type may represent a type in which the split boundary crosses the upper boundary and the right boundary of the target block.

Further, when the target block is split into the third type, i.e., the split boundary crosses the upper boundary and the right boundary of the target block, the upper width of the first sub-block is UW, and the x component of the top-left sample position of the first sub-block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (UW, −1) and the location of the second spatial neighboring block may be (UW−1, −1).

Further, when the target block is split into the third type, i.e., the split boundary crosses the upper boundary and the right boundary of the target block, the upper width of the first sub-block is UW, and the x component of the top-left sample position of the target block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (UW, −1) and the location of the second spatial neighboring block may be (UW−1, −1).

Further, when the target block is split into the third type, i.e., the split boundary crosses the upper boundary and the right boundary of the target block, and the x component of the top-left sample position of the second sub-block is 0 and the y component is 0, the second motion information candidate list may include the spatial candidate indicating the motion information of the spatial neighboring block. In this case, the location of the spatial neighboring block may be (−1, −1). Further, the second motion information candidate list may include a temporal candidate indicating motion information of the temporal neighboring block in the co-located picture. For example, when the target block is split into the third type, i.e., the split boundary crosses the upper boundary and the right boundary of the target block, the upper width of the second sub-block is UW, the right height of the second sub-block is RH, the size of the target block is N×N, and the x component of the top-left sample position of the second sub-block is 0 and the y component is 0, the location of the temporal neighboring block may be (UW, N). Meanwhile, the location of the temporal neighboring block may be (UW−1, RH−1).

Further, when the target block is split into the third type, i.e., the split boundary crosses the upper boundary and the right boundary of the target block, the upper width of the second sub-block is UW, the size of the target block is N×N, and the x component of the top-left sample position of the second sub-block is 0 and the y component is 0, the second motion information candidate list may include the spatial candidate indicating the motion information of the spatial neighboring block. In this case, the location of the spatial neighboring block may be (N−1−UW, −1). Further, the second motion information candidate list may include a temporal candidate indicating motion information of the temporal neighboring block in the co-located picture. For example, when the target block is split into the third type, i.e., the split boundary crosses the upper boundary and the right boundary of the target block, the right height of the second sub-block is RH, the size of the target block is N×N, and the x component of the top-left sample position of the target block is 0 and the y component is 0, the location of the temporal neighboring block may be (N, N). Meanwhile, the location of the temporal neighboring block may be (N−1, RH−1).

As another example, a fourth type may represent a type in which the second sub-block has the triangular shape and is split to include the bottom-left sample of the target block. Further, the fourth type may represent a type in which the split boundary crosses the left boundary and the lower boundary of the target block.

Further, when the target block is split into the fourth type, i.e., the split boundary crosses the left boundary and the lower boundary of the target block, the upper width of the second sub-block is UW, the lower width of the second sub-block is DW, the right height of the second sub-block is RH, and the x component of the top-left sample position of the second sub-block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (UW−1−DW, RH) and the location of the second spatial neighboring block may be (UW−1−DW, RH−1).

Further, when the target block is split into the fourth type, i.e., the split boundary crosses the left boundary and the lower boundary of the target block, the lower width of the second sub-block is DW, the size of the target block is N×N, and the x component of the top-left sample position of the target block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (N−1−DW, N) and the location of the second spatial neighboring block may be (N−1−DW, N−1).

Further, when the target block is split into the fourth type, i.e., the split boundary crosses the left boundary and the lower boundary of the target block, the left height of the first sub-block is LH, the lower width of the first sub-block is DW, and the x component of the top-left sample position of the first sub-block is 0 and the y component is 0, the first motion information candidate list may include the spatial candidate indicating the motion information of the spatial neighboring block in the co-located picture. In this case, the location of the temporal neighboring block may be (DW−1, LH−1).

Further, when the target block is split into the fourth type, i.e., the split boundary crosses the left boundary and the lower boundary of the target block, the lower width of the first sub-block is DW, the size of the target block is N×N, and the x component of the top-left sample position of the target block is 0 and the y component is 0, the first motion information candidate list may include the temporal candidate indicating the motion information of the temporal neighboring block in the co-located picture. In this case, the location of the temporal neighboring block may be (DW−1, N−1).

As another example, a fifth type may represent a type in which the first sub-block and the second sub-block have a rectangular shape and the left boundary of the first sub-block and the right height of the second sub-block are split to be the same as the height of the target block. Further, the fifth type may represent a type in which the split boundary crosses the upper boundary and the lower boundary of the target block.

When the target block is split into the fifth type, i.e., the split boundary crosses the upper boundary and the lower boundary of the target block, the upper width of the first sub-block is UW, and the x component of the top-left sample position of the first sub-block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (UW, −1) and the location of the second spatial neighboring block may be (UW−1, −1). Further, the first motion information candidate list may include a temporal candidate indicating motion information of the temporal neighboring block in the co-located picture. For example, when the target block is split into the fifth type, i.e., the split boundary crosses the upper boundary and the lower boundary of the target block, the left height of the first sub-block is LH, the lower width of the first sub-block is DW, and the x component of the top-left sample position of the first sub-block is 0 and the y component is 0, the location of the temporal neighboring block may be (DW−1, LH−1).

Further, when the target block is split into the fifth type, i.e., the split boundary crosses the upper boundary and the lower boundary of the target block, the upper width of the first sub-block is UW, the lower width of the first sub-block is DW, the size of the target block is N×N, and the x component of the top-left sample position of the target block is 0 and the y component is 0, the first motion information candidate list may include at least one of a first spatial candidate indicating the motion information of the first spatial neighboring block and a second spatial candidate indicating the motion information of the second spatial neighboring block, and a temporal candidate indicating the motion information of the temporal neighboring block in the co-located picture. In this case, the location of the first spatial neighboring block may be (UW, −1) and the location of the second spatial neighboring block may be (UW−1, −1), and the location of the temporal neighboring block may be (DW−1, N−1).

Further, when the target block is split into the fifth type, i.e., the split boundary crosses the upper boundary and the lower boundary of the target block, the upper width of the second sub-block is UW, the lower width of the second sub-block is DW, the right height of the second sub-block is RH, and the x component of the top-left sample position of the second sub-block is 0 and the y component is 0, the second motion information candidate list may include at least one of a first spatial candidate indicating the motion information of the first spatial neighboring block, a second spatial candidate indicating the motion information of the second spatial neighboring block, and a third spatial candidate indicating the motion information of the third spatial neighboring block, and a temporal candidate indicating the motion information of the temporal neighboring block in the co-located picture. In this case, the location of the first spatial neighboring block may be (UW−1−DW, RH), the location of the second spatial neighboring block may be (UW−1−DW, RH−1), the location of the third spatial neighboring block may be (−1, −1), and the location of the temporal neighboring block may be (UW−1, RH−1).

Further, when the target block is split into the fifth type, i.e., the split boundary crosses the upper boundary and the lower boundary of the target block, the upper width of the second sub-block is UW, the lower width of the first sub-block is DW, the size of the target block is N×N, and the x component of the top-left sample position of the target block is 0 and the y component is 0, the second motion information candidate list may include at least one of a first spatial candidate indicating the motion information of the first spatial neighboring block, a second spatial candidate indicating the motion information of the second spatial neighboring block, and a third spatial candidate indicating the motion information of the third spatial neighboring block, and a temporal candidate indicating the motion information of the temporal neighboring block in the co-located picture. In this case, the location of the first spatial neighboring block may be (N−1−DW, N), the location of the second spatial neighboring block may be (N−1−DW, N−1), the location of the third spatial neighboring block may be (N−1−UW, −1), and the location of the temporal neighboring block may be (N, N).

As another example, a sixth type may represent a type in which the first sub-block and the second sub-block have a rectangular shape and the upper boundary of the first sub-block and the lower width of the second sub-block are split to be the same as the height of the target block. Further, the sixth type may represent a type in which the split boundary crosses the left boundary and the right boundary of the target block.

Further, when the target block is split into the sixth type, i.e., the split boundary crosses the left boundary and the right boundary of the target block, the left height of the first sub-block is LH, and the x component of the top-left sample position of the first sub-block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (−1, LH) and the location of the second spatial neighboring block may be (−1, LH−1). Further, the first motion information candidate list may include a temporal candidate indicating motion information of the temporal neighboring block in the co-located picture. For example, when the target block is split into the sixth type, i.e., the split boundary crosses the left boundary and the right boundary of the target block, the left height of the first sub-block is LH, and the x component of the top-left sample position of the first sub-block is 0 and the y component is 0, the location of the temporal neighboring block may be (0, LH−1).

Further, when the target block is split into the sixth type, i.e., the split boundary crosses the left boundary and the right boundary of the target block, the left height of the first sub-block is LH, and the x component of the top-left sample position of the target block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (−1, LH) and the location of the second spatial neighboring block may be (−1, LH−1). Further, the first motion information candidate list may include a temporal candidate indicating motion information of the temporal neighboring block in the co-located picture. For example, when the target block is split into the sixth type, i.e., the split boundary crosses the left boundary and the right boundary of the target block, the left height of the first sub-block is LH, and the x component of the top-left sample position of the target block is 0 and the y component is 0, the location of the temporal neighboring block may be (0, LH−1).

Further, when the target block is split into the sixth type, i.e., the split boundary crosses the left boundary and the right boundary of the target block, the lower width of the second sub-block is DW, the left height of the second sub-block is LH, the right height of the second sub-block is RH, and the x component of the top-left sample position of the second sub-block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (DW, LH−1−RH) and the location of the second spatial neighboring block may be (DW−1, LH−1−RH).

Further, when the target block is split into the sixth type, i.e., the split boundary crosses the left boundary and the right boundary of the target block, the right height of the second sub-block is RH, the size of the target block is N×N, and the x component of the top-left sample position of the target block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (N, N−1−RH) and the location of the second spatial neighboring block may be (N−1, N−1−RH).

The encoding apparatus performs inter prediction of the first sub-block based on the first motion information candidate list and performs inter prediction and encoding of the second sub-block based on the second motion information candidate list (S1420). The encoding apparatus may separately perform the inter prediction for each of the first sub-block and the second sub-block. The encoding apparatus may determine a mode applied to the first sub-block between the merge mode and the motion vector prediction (MVP) mode. Further, the encoding apparatus may determine a mode applied to the second sub-block between the merge mode and the motion vector prediction (MVP) mode.

The encoding apparatus may perform inter prediction of the first sub-block based on the first motion information candidate list. Specifically, the encoding apparatus may perform the motion information of the first sub-block based on the first motion information candidate list. For example, when the merge mode is applied to the first sub-block, the first motion information candidate list may represent a merge candidate list and the motion information of the candidate selected in the first motion information candidate list may be derived as the motion information of the first sub-block. A candidate suitable for prediction of the first sub-block may be selected among the candidates included in the first motion information candidate list. Further, prediction information of the first sub-block may be generated and the prediction information may include a merge index indicating the selected candidate. The motion information of the first sub-block may include a reference picture index and a motion vector.

The encoding apparatus may perform the inter prediction for the first sub-block based on the motion information. Specifically, the encoding apparatus may derive a reference block of the first sub-block based on the motion information. That is, the encoding apparatus may derive a reference block indicating the motion vector in the reference picture indicated by the reference picture index. The encoding apparatus may predict the first sub-block based on the reference block. That is, the encoding apparatus may derive a reconstructed sample in the reference block as a predicted sample of the first sub-block.

Further, for example, when the motion vector prediction (MVP) mode is applied to the first sub-block, the first motion information candidate list may represent an MVP candidate list and a motion vector of the candidate selected in the first motion information candidate list may be derived as a motion vector predictor (MVP) of the first sub-block. A candidate suitable for prediction of the first sub-block may be selected among the candidates included in the first motion information candidate list. The encoding apparatus may derive the motion vector of the first sub-block by using the MVP.

Further, the prediction information of the first sub-block may be generated and the prediction information may include an MVP flag indicating the selected candidate. Further, the prediction information may include a motion vector difference (MVD) of the first sub-block.

The encoding apparatus may select the reference picture of the first sub-block among the reference pictures included in the reference picture list. The prediction information may include a reference picture index indicating the reference picture.

The encoding apparatus may perform the inter prediction for the first sub-block based on the motion information. Specifically, the encoding apparatus may derive the reference block of the first sub-block based on the motion vector and the reference picture index. That is, the encoding apparatus may derive a reference block indicating the motion vector in the reference picture indicated by the reference picture index. The encoding apparatus may predict the first sub-block based on the reference block. That is, the encoding apparatus may derive a reconstructed sample in the reference block as a predicted sample of the first sub-block.

Further, the encoding apparatus may perform inter prediction of the second sub-block based on the second motion information candidate list. Specifically, the encoding apparatus may perform the motion information of the second sub-block based on the second motion information candidate list. For example, when the merge mode is applied to the second sub-block, the second motion information candidate list may represent a merge candidate list and the motion information of the candidate selected in the second motion information candidate list may be derived as the motion information of the second sub-block. A candidate suitable for prediction of the second sub-block may be selected among the candidates included in the second motion information candidate list. Further, prediction information of the second sub-block may be generated and the prediction information may include a merge index indicating the selected candidate. The motion information of the second sub-block may include the reference picture index and the motion vector.

The encoding apparatus may perform the inter prediction for the second sub-block based on the motion information. Specifically, the encoding apparatus may derive a reference block of the second sub-block based on the motion information. That is, the encoding apparatus may derive a reference block indicating the motion vector in the reference picture indicated by the reference picture index. The encoding apparatus may predict the second sub-block based on the reference block. That is, the encoding apparatus may derive the reconstructed sample in the reference block as the predicted sample of the second sub-block.

Further, for example, when the motion vector prediction (MVP) mode is applied to the second sub-block, the second motion information candidate list may represent an MVP candidate list and the motion vector of the candidate selected in the second motion information candidate list may be derived as the motion vector predictor (MVP) of the second sub-block. A candidate suitable for prediction of the second sub-block may be selected among the candidates included in the second motion information candidate list. The encoding apparatus may derive the motion vector of the second sub-block by using the MVP.

Further, the prediction information of the second sub-block may be generated and the prediction information may include the MVP flag indicating the selected candidate. Further, the prediction information may include the motion vector difference (MVD) of the second sub-block.

The encoding apparatus may select the reference picture of the second sub-block among the reference pictures included in the reference picture list. The prediction information may include the reference picture index indicating the reference picture.

The encoding apparatus may perform the inter prediction for the second sub-block based on the motion information. Specifically, the encoding apparatus may derive the reference block of the second sub-block based on the motion vector and the reference picture index. That is, the encoding apparatus may derive a reference block indicating the motion vector in the reference picture indicated by the reference picture index. The encoding apparatus may predict the second sub-block based on the reference block. That is, the encoding apparatus may derive the reconstructed sample in the reference block as the predicted sample of the second sub-block.

Further, the encoding apparatus may perform filtering for a first sample adjacent to the second sub-block among the samples of the first sub-block. The filtering may represent overlapped motion compensation filtering. For example, the encoding apparatus may derive sample value 1 of the first sample based on the motion information of the first sub-block and derive sample value 2 of the first sample based on the motion information of the second sub-block. Next, the encoding apparatus may derive a sample value of the first sample based on the sample value 1 and the sample value 2 of the first sample. For example, the encoding apparatus may derive the sample value of the first sample by weighted sum of the sample value 1 and the sample value 2 of the first sample. Further, the sample value of the first sample may be derived based on Equation 1 described above. Alternatively, the sample value of the first sample may be derived based on Equation 2 described above.

Further, the encoding apparatus may perform filtering for a first sample adjacent to the second sub-block and a second sample adjacent to the left side (or upper side) of the first sample among the samples of the first sub-block. The filtering may represent overlapped motion compensation filtering. For example, the encoding apparatus may derive sample value 1 of the first sample based on the motion information of the first sub-block and derive sample value 2 of the first sample based on the motion information of the second sub-block. Next, the encoding apparatus may derive a sample value of the first sample based on the sample value 1 and the sample value 2 of the first sample. For example, the encoding apparatus may derive the sample value of the first sample by weighted sum of the sample value 1 and the sample value 2 of the first sample. Further, the sample value of the first sample may be derived based on Equation 1 described above. Further, the encoding apparatus may derive sample value 1 of the first sample based on the motion information of the first sub-block and derive sample value 2 of the second sample based on the motion information of the second sub-block. Next, the encoding apparatus may derive the sample value of the second sample based on the sample value 1 and the sample value 2 of the second sample. For example, the encoding apparatus may derive the sample value of the second sample by weighted sum of the sample value 1 and the sample value 2 of the second sample. Further, the sample value of the second sample may be derived based on Equation 3 described above.

Further, the encoding apparatus may perform filtering for the first sample adjacent to the first sub-block among the samples of the second sub-block. The filtering may represent overlapped motion compensation filtering. For example, the encoding apparatus may derive sample value 1 of the first sample based on the motion information of the first sub-block and derive sample value 2 of the first sample based on the motion information of the second sub-block. Next, the encoding apparatus may derive a sample value of the first sample based on the sample value 1 and the sample value 2 of the first sample. For example, the encoding apparatus may derive the sample value of the first sample by weighted sum of the sample value 1 and the sample value 2 of the first sample. Further, the sample value of the first sample may be derived based on Equation 1 described above. Alternatively, the sample value of the first sample may be derived based on Equation 2 described above.

Further, the encoding apparatus may perform filtering for a first sample adjacent to the first sub-block and a second sample adjacent to the right side (or lower side) of the first sample among the samples of the second sub-block. The filtering may represent overlapped motion compensation filtering. For example, the encoding apparatus may derive sample value 1 of the first sample based on the motion information of the first sub-block and derive sample value 2 of the first sample based on the motion information of the second sub-block. Next, the encoding apparatus may derive a sample value of the first sample based on the sample value 1 and the sample value 2 of the first sample. For example, the encoding apparatus may derive the sample value of the first sample by weighted sum of the sample value 1 and the sample value 2 of the first sample. Further, the sample value of the first sample may be derived based on Equation 1 described above. Further, the encoding apparatus may derive sample value 1 of the first sample based on the motion information of the first sub-block and derive sample value 2 of the second sample based on the motion information of the second sub-block. Next, the encoding apparatus may derive the sample value of the second sample based on the sample value 1 and the sample value 2 of the second sample. For example, the encoding apparatus may derive the sample value of the second sample by weighted sum of the sample value 1 and the sample value 2 of the second sample. Further, the sample value of the second sample may be derived based on Equation 3 described above.

Meanwhile, the numbers of samples in the first sub-block and the second sub-block in which the filtering is performed may be determined in units of slice or block. Alternatively, the numbers of first sub-blocks and second sub-blocks in which the filtering is performed may be determined based on the size of the target block. For example, when the size of the target block is the 16×16 size, the filtering may be applied to one sample around the split boundary among the samples of the first sub-block and/or the second sub-block. That is, when the size of the target block is the 16×16 size, the filtering may be performed in the first sample adjacent to the second sub-block among the samples of the first sub-block and the filtering may be performed in the first sample adjacent to the first sub-block among the samples of the second sub-block. Further, when the size of the target block is larger than the 16×16 size, the filtering may be applied to two samples around the split boundary among the samples of the first sub-block and/or the second sub-block. That is, when the size of the target block is larger than the 16×16 size, the filtering may be performed for the first sample adjacent to the second sub-block and the second sample adjacent to the left side (or upper side) of the first sample among the samples of the first sub-block and the filtering may be performed for the first sample adjacent to the first sub-block and the second sample adjacent to the right side (or lower side) of the first sample among the samples of the second sub-block.

Meanwhile, information indicating whether to apply the filtering may be generated. The information indicating whether to apply the filtering may be transmitted by the unit such as sequence parameter set (SPS), picture parameter set (PPS), slice, block, etc., and whether to apply the filtering to the first sub-block and the second sub-block may be determined based on the information indicating whether to apply the filtering. Alternatively, whether to apply the filtering to the target block may be determined based on the information indicating whether to apply the filtering.

Meanwhile, the encoding apparatus may generate a residual signal of the first sub-block based on the predicted sample of the first sub-block. The residual signal may be derived as a difference between an original sample of the first sub-block and the predicted sample. Further, the encoding apparatus may generate the residual signal of the second sub-block based on the predicted sample of the second sub-block. The residual signal may be derived as the difference between the original sample of the second sub-block and the predicted sample.

The encoding apparatus may generate residual information of the first sub-block and the second sub-block by performing one transformation for the residual signal of the first sub-block and the residual signal of the second sub-block. For example, the residual signal of the first sub-block and the residual signal of the second sub-block may be combined into one block and the transformation process for the combined block may be performed.

Further, the encoding apparatus may generate residual information of the first sub-block and residual information of the second sub-block by performing separate transformation for the residual signal of the first sub-block and the residual signal of the second sub-block.

For example, the residual signal of the first sub-block is transformed based on a transform kernel of a size including the size of the first sub-block to generate the residual information of the first sub-block. Here, the transform kernel may represent the transform kernel having the smallest size among transform kernels having sizes including the size of the first sub-block.

Alternatively, the residual signal of the first sub-block is transformed to generate the residual information of the first sub-block, but a signal padded with 0 may be combined to the region of the second sub-block to the residual signal. In this case, the transform may be performed based on the transform kernel of the size of the target block.

Alternatively, the residual signal of the first sub-block is transformed to generate the residual information of the first sub-block, but the residual signal may be rearranged to a rectangular block. Meanwhile, the residual signal may represent residual samples and the residual information may represent transform coefficients.

The encoding apparatus encodes and transmits split information and residual information for the target block (S1430). The encoding apparatus may encode the split information for the target block and output the encoded split information in the form of the bitstream. The split information may include information indicating the angle of the split boundary and information indicating the distance between the split boundary and the center of the target block. The target block may be split into the first sub-block and the second sub-block through the split boundary derived based on the information indicating the angle of the split boundary and/or the information indicating the distance between the split boundary and the center of the target block. Further, the target block may be split along the split boundary which is not vertical to a predetermined boundary and crosses the target block. Alternatively, the additional split information may include a GP split index indicating one of a plurality of predetermined split types.

Further, the split information for the target block may include a geometry partition (GP) split flag for the target block and the GP split flag may indicate whether the target block is split into sub-blocks having various forms. Alternatively, the GP split flag may indicate whether the target block is split into sub-blocks through a predetermined split boundary. When the value of the GP split flag is 1, i.e., when the GP split flag indicates that the target block is split into the sub-blocks, the target block may be split into a first sub-block and a second sub-block through a split boundary derived based on information indicating the angle of the split boundary and/or information indicating a distance between the split boundary and the center of the target block.

Further, the encoding apparatus may encode the residual information of the target information through the bitstream. That is, the encoding apparatus may transmit the residual information of the first sub-block and the residual information of the first sub-block through the bitstream.

Further, the encoding apparatus may encode the prediction information for the first sub-block and output the encoded prediction information in the form of the bitstream. When the merge mode is applied to the first sub-block, the prediction information may include a merge index of the first sub-block. The merge index may indicate one of the candidates of the first motion information candidate list of the first sub-block. Further, when the MVP mode is applied to the first sub-block, the prediction information may include an MVP flag, an MVD, and a reference picture index of the first sub-block. The MVP flag may indicate one of the candidates of the first motion information candidate list and the motion vector of the first sub-block may be derived by adding the motion vector of the candidate derived based on the MVP flag and the MVD. The reference picture index may indicate a reference picture for predicting the first sub-block.

Further, the encoding apparatus may encode the information indicating whether to apply the filtering through the bitstream. The information indicating whether to apply the filtering may be transmitted by the unit such as sequence parameter set (SPS), picture parameter set (PPS), slice, block, etc., and whether to apply the filtering to the first sub-block and the second sub-block may be determined based on the information indicating whether to apply the filtering. Alternatively, whether to apply the filtering to the target block may be determined based on the information indicating whether to apply the filtering.

Figure 15:
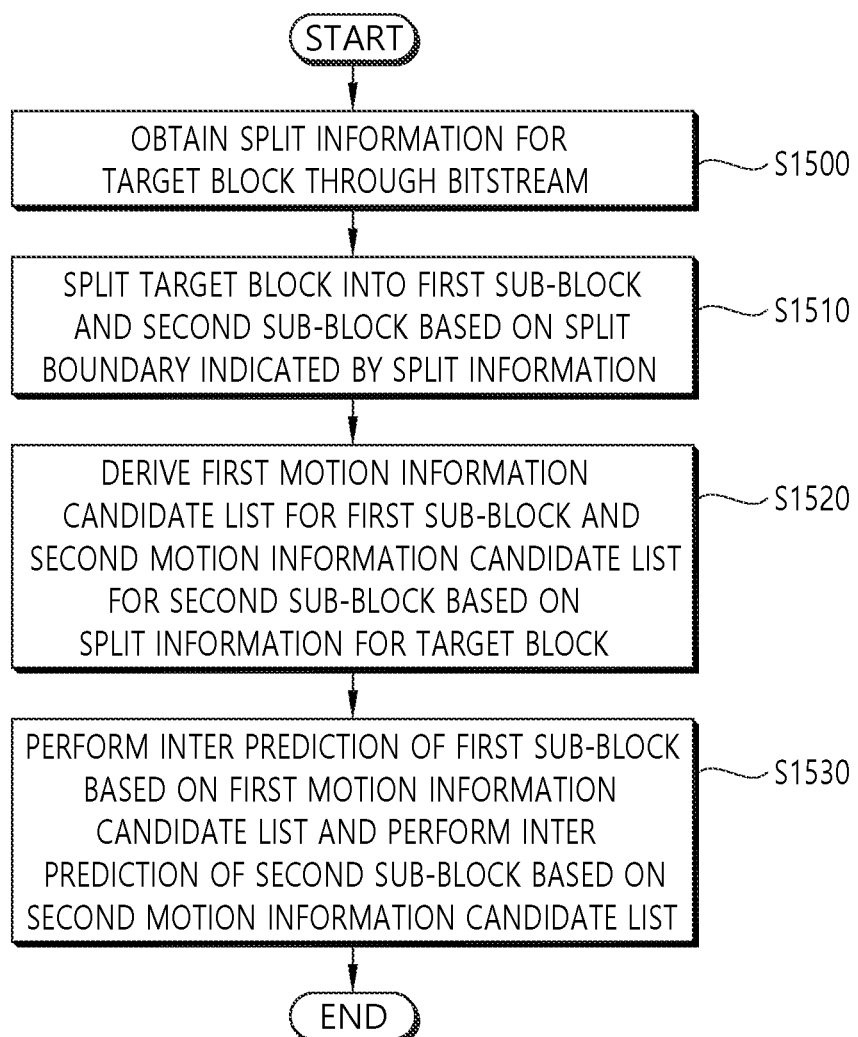
FIG. 15 schematically illustrates a video decoding method by a decoding apparatus according to the present disclosure.

FIG. 15 schematically illustrates a video decoding method by a decoding apparatus according to the present disclosure. The method disclosed in FIG. 15 may be performed by the decoding apparatus disclosed in FIG. 2. Specifically, for example, S1500 of FIG. 15 may be performed by the entropy decoding unit of the decoding apparatus, S1510 may be performed by the picture partitioner, and S1520 and S1530 may be performed by the predictor of the decoding apparatus.

The decoding apparatus obtains split information for a target block through a bitstream (S1500). The target block may be a block split in a quad-tree (QT) structure and a block of a terminal node in the QT structure, which is no longer split in the QT structure. The terminal node may also be referred to as a leaf node. Here, the QT structure may represent a structure in which a 2N×2N sized target block is split into four N×N sized sub-blocks. In this case, the target block may be split in a geometry partition (GP) structure and the split information may be represented as a GP split structure. The GP structure may represent a structure in which the target block is split into various types of sub-blocks. Further, the GP structure may represent a structure in which the target block is split based on a predetermined split boundary.

The split information may include information indicating the angle of the split boundary and information indicating the distance between the split boundary and the center of the target block. The target block may be split into the first sub-block and the second sub-block through the split boundary derived based on the information indicating the angle of the split boundary and/or the information indicating the distance between the split boundary and the center of the target block. Further, the target block may be split along the split boundary which is not vertical to a predetermined boundary and crosses the target block. Alternatively, the additional split information may include a GP split index indicating one of a plurality of predetermined split types.

Further, the split information for the target block may include a geometry partition (GP) split flag for the target block and the GP split flag may indicate whether the target block is split into sub-blocks having various forms. Alternatively, the GP split flag may indicate whether the target block is split into sub-blocks through a predetermined split boundary. When the value of the GP split flag is 1, i.e., when the GP split flag indicates that the target block is split into the sub-blocks, the target block may be split into a first sub-block and a second sub-block through a split boundary derived based on information indicating the angle of the split boundary and/or information indicating a distance between the split boundary and the center of the target block.

The decoding apparatus splits the target block into a first sub-block and a second sub-block based on a split boundary indicated by the split information (S1510). The split information may include information indicating the angle of the split boundary of the target block and information indicating the distance between the split boundary and the center of the target block and in this case, the target block may be split into the first sub-block and the second sub-block through the split boundary derived based on the information indicating the angle of the split boundary and the information indicating the distance between the split boundary and the center of the target block. Alternatively, the split information may include a GP split index indicating one of a plurality of predetermined split types. The split type may indicate which boundary of the target block the split boundary crosses. In this case, the target block may be split into the first sub-block and the second sub-block of the type indicated by the GP split index. The first sub-block may represent a block positioned at the left side among the blocks split from the target block and the second sub-block may represent a block positioned at the right side among the blocks split from the target block. Further, the first sub-block and the second sub-block may be non-rectangular blocks.

The decoding apparatus derives a first motion information candidate list for the first sub-block and a second motion information candidate list for the second sub-block based on the split type of the target block (S1520). The decoding apparatus may derive the first motion information candidate list and the second motion information candidate list based on the split type derived based on the split information. That is, a spatial neighboring block and/or a temporal neighboring block of the first sub-block may be derived according to the split type derived based on the split information or the spatial neighboring block and/or the temporal neighboring block of the second sub-block may be derived. The first motion information candidate list may include a spatial candidate indicating motion information of the spatial neighboring block of the first sub-block and/or a temporal candidate indicating motion information of the temporal neighboring block of the first sub-block in the co-located picture. That is, the first motion information candidate list for the first sub-block may be different from the second motion information candidate list for the second sub-block. A left height or a right height of the first sub-block may be equal to or smaller than a height of the target block and an upper width or a lower width of the first sub-block may be equal to or smaller than a width of the target block. Further, the left height or right height of the second sub-block may be equal to or smaller than the height of the target block and the upper width or lower width of the second sub-block may be equal to or smaller than the width of the target block.

Meanwhile, when a merge mode is applied to the first sub-block, the first motion information candidate list may represent a merge candidate list and when a motion vector prediction (MVP) mode is applied to the first sub-block, the first motion information candidate list may represent an MVP candidate list. Further, the second motion information candidate list may include a spatial candidate indicating motion information of the spatial neighboring block of the second sub-block and/or a temporal candidate indicating motion information of the temporal neighboring block of the second sub-block in the co-located picture. Meanwhile, when the merge mode is applied to the second sub-block, the second motion information candidate list may represent the merge candidate list and when the motion vector prediction (MVP) mode is applied to the second sub-block, the second motion information candidate list may represent the MVP candidate list.

Meanwhile, the split types derived based on the split information may include six first to sixth types.

For example, the first type may represent a type in which the first sub-block has the triangular shape and is split to include the top-left sample of the target block. Further, the first type may represent a type in which the split boundary crosses the upper boundary and the left boundary of the target block.

When the target block is split into the first type, i.e., the split boundary crosses the upper boundary and the left boundary of the target block, the upper width of the first sub-block is UW, the left height of the first sub-block is LH, and an x component of the top-left sample position of the first sub-block is 0 and a y component is 0, the first motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, a location of the first spatial neighboring block may be (−1, LH), the location of the second spatial neighboring block may be (−1, LH−1), the location of the third spatial neighboring block may be (UW, −1), and the location of the fourth spatial neighboring block may be (UW−1, −1). Further, the first motion information candidate list may include a temporal candidate indicating motion information of the temporal neighboring block in the co-located picture. In this case, the location of the temporal neighboring block may be (0, LH−1).

Further, when the target block is split into the first type, i.e., the split boundary crosses the upper boundary and the left boundary of the target block, the upper width of the first sub-block is UW, the left height of the first sub-block is LH, and an x component of the top-left sample position of the target block is 0 and a y component is 0, the first motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, a location of the first spatial neighboring block may be (−1, LH), the location of the second spatial neighboring block may be (−1, LH−1), the location of the third spatial neighboring block may be (UW, −1), and the location of the fourth spatial neighboring block may be (UW−1, −1). Further, the first motion information candidate list may include a temporal candidate indicating motion information of the temporal neighboring block in the co-located picture. In this case, the location of the temporal neighboring block may be (0, LH−1).

Further, when the target block is split into the first type, i.e., the split boundary crosses the upper boundary and the left boundary of the target block, the upper width of the second sub-block is UW, and the x component of the top-left sample position of the second sub-block is 0 and the y component is 0, the second motion information candidate list may include the spatial candidate indicating the motion information of the spatial neighboring block. In this case, the location of the spatial neighboring block may be (−1, −1).

Further, when the target block is split into the first type, i.e., the split boundary crosses the upper boundary and the left boundary of the target block, the upper width of the second sub-block is UW, the size of the target block is N×N, and the x component of the top-left sample position of the target block is 0 and the y component is 0, the second motion information candidate list may include the spatial candidate indicating the motion information of the spatial neighboring block. In this case, the location of the spatial neighboring block may be (N−UW−1, −1).

As another example, the second type may represent a type in which the second sub-block has the triangular shape and is split to include the bottom-right sample of the target block. Further, the second type may represent a type in which the split boundary crosses the right boundary and the lower boundary of the target block.

When the target block is split into the second type, i.e., the split boundary crosses the right boundary and the lower boundary of the target block, the lower width of the second sub-block is DW, the right height of the second sub-block is RH, and the x component of the top-left sample position of the second sub-block is 0 and the y component is 0, the second motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, the location of the first spatial neighboring block may be (−DW, RH), the location of the second spatial neighboring block may be (−DW, RH−1), the location of the third spatial neighboring block may be (−1, −1), and the location of the fourth spatial neighboring block may be (0, −1). Further, the first motion information candidate list may include a temporal candidate indicating motion information of the temporal neighboring block in the co-located picture. In this case, the location of the temporal neighboring block may be (0, LH).

Further, when the target block is split into the second type, i.e., the split boundary crosses the right boundary and the lower boundary of the target block, the lower width of the second sub-block is DW, the right height of the second sub-block is RH, the size of the target block is N×N, and the x component of the top-left sample position of the target block is 0 and the y component is 0, the second motion information candidate list may include a first spatial candidate indicating motion information of a first spatial neighboring block, a second spatial candidate indicating motion information of a second spatial neighboring block, a third spatial candidate indicating motion information of a third spatial neighboring block, and/or a fourth spatial candidate indicating motion information of a fourth spatial neighboring block. In this case, the location of the first spatial neighboring block may be (N−1−DW, N), the location of the second spatial neighboring block may be (N−1−DW, N−1), the location of the third spatial neighboring block may be (N, N−1−RH), and the location of the fourth spatial neighboring block may be (N−1, N−1−RH). Further, the second motion information candidate list may include a temporal candidate indicating motion information of the temporal neighboring block in the co-located picture. In this case, the location of the temporal neighboring block may be (N, N).

Further, when the target block is split into the second type, i.e., the split boundary crosses the right boundary and the lower boundary of the target block, the left height of the first sub-block is LH, the lower width of the first sub-block is DW, and the x component of the top-left sample position of the first sub-block is 0 and the y component is 0, the first motion information candidate list may include the temporal candidate indicating the motion information of the temporal neighboring block in the co-located picture. In this case, the location of the temporal neighboring block may be (DW−1, LH−1).

Further, when the target block is split into the second type, i.e., the split boundary crosses the right boundary and the lower boundary of the target block, the left height of the first sub-block is LH, the lower width of the first sub-block is DW, and the x component of the top-left sample position of the target block is 0 and the y component is 0, the first motion information candidate list may include the temporal candidate indicating the motion information of the temporal neighboring block in the co-located picture. In this case, the location of the temporal neighboring block may be (DW−1, LH−1).

As another example, the third type may represent a type in which the second sub-block has the triangular shape and is split to include the top-right sample of the target block. Further, the third type may represent a type in which the split boundary crosses the upper boundary and the right boundary of the target block.

Further, when the target block is split into the third type, i.e., the split boundary crosses the upper boundary and the right boundary of the target block, the upper width of the first sub-block is UW, and the x component of the top-left sample position of the first sub-block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (UW, −1) and the location of the second spatial neighboring block may be (UW−1, −1).

Further, when the target block is split into the third type, i.e., the split boundary crosses the upper boundary and the right boundary of the target block, the upper width of the first sub-block is UW, and the x component of the top-left sample position of the target block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (UW, −1) and the location of the second spatial neighboring block may be (UW−1, −1).

Further, when the target block is split into the third type, i.e., the split boundary crosses the upper boundary and the right boundary of the target block, and the x component of the top-left sample position of the second sub-block is 0 and the y component is 0, the second motion information candidate list may include the spatial candidate indicating the motion information of the spatial neighboring block. In this case, the location of the spatial neighboring block may be (−1, −1). Further, the second motion information candidate list may include a temporal candidate indicating motion information of the temporal neighboring block in the co-located picture. For example, when the target block is split into the third type, i.e., the split boundary crosses the upper boundary and the right boundary of the target block, the upper width of the second sub-block is UW, the right height of the second sub-block is RH, the size of the target block is N×N, and the x component of the top-left sample position of the second sub-block is 0 and the y component is 0, the location of the temporal neighboring block may be (UW, N). Meanwhile, the location of the temporal neighboring block may be (UW−1, RH−1).

Further, when the target block is split into the third type, i.e., the split boundary crosses the upper boundary and the right boundary of the target block, the upper width of the second sub-block is UW, the size of the target block is N×N, and the x component of the top-left sample position of the target block is 0 and the y component is 0, the second motion information candidate list may include the spatial candidate indicating the motion information of the spatial neighboring block. In this case, the location of the spatial neighboring block may be (N−1−UW, −1). Further, the second motion information candidate list may include a temporal candidate indicating motion information of the temporal neighboring block in the co-located picture. For example, when the target block is split into the third type, i.e., the split boundary crosses the upper boundary and the right boundary of the target block, the right height of the second sub-block is RH, the size of the target block is N×N, and the x component of the top-left sample position of the target block is 0 and the y component is 0, the location of the temporal neighboring block may be (N, N). Meanwhile, the location of the temporal neighboring block may be (N−1, RH−1).

As another example, a fourth type may represent a type in which the first sub-block has the triangular shape and is split to include the bottom-left sample of the target block. Further, the fourth type may represent a type in which the split boundary crosses the left boundary and the lower boundary of the target block.

Further, when the target block is split into the fourth type, i.e., the split boundary crosses the left boundary and the lower boundary of the target block, the upper width of the second sub-block is UW, the lower width of the second sub-block is DW, the right height of the second sub-block is RH, and the x component of the top-left sample position of the second sub-block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (UW−1−DW, RH) and the location of the second spatial neighboring block may be (UW−1−DW, RH−1).

Further, when the target block is split into the fourth type, i.e., the split boundary crosses the left boundary and the lower boundary of the target block, the lower width of the second sub-block is DW, the size of the target block is N×N, and the x component of the top-left sample position of the target block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (N−1−DW, N) and the location of the second spatial neighboring block may be (N−1−DW, N−1).

Further, when the target block is split into the fourth type, i.e., the split boundary crosses the left boundary and the lower boundary of the target block, the left height of the first sub-block is LH, the lower width of the first sub-block is DW, and the x component of the top-left sample position of the first sub-block is 0 and the y component is 0, the first motion information candidate list may include the temporal candidate indicating the motion information of the temporal neighboring block in the co-located picture. In this case, the location of the temporal neighboring block may be (DW−1, LH−1).

Further, when the target block is split into the fourth type, i.e., the split boundary crosses the left boundary and the lower boundary of the target block, the lower width of the first sub-block is DW, the size of the target block is N×N, and the x component of the top-left sample position of the target block is 0 and the y component is 0, the first motion information candidate list may include the temporal candidate indicating the motion information of the temporal neighboring block in the co-located picture. In this case, the location of the temporal neighboring block may be (DW−1, N−1).

As another example, a fifth type may represent a type in which the first sub-block and the second sub-block have a rectangular shape and the left boundary of the first sub-block and the right height of the second sub-block are split to be the same as the height of the target block. Further, the fifth type may represent a type in which the split boundary crosses the upper boundary and the lower boundary of the target block.

When the target block is split into the fifth type, i.e., the split boundary crosses the upper boundary and the lower boundary of the target block, the upper width of the first sub-block is UW, and the x component of the top-left sample position of the first sub-block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (UW, −1) and the location of the second spatial neighboring block may be (UW−1, −1). Further, the first motion information candidate list may include a temporal candidate indicating motion information of the temporal neighboring block in the co-located picture. For example, when the target block is split into the fifth type, i.e., the split boundary crosses the upper boundary and the lower boundary of the target block, the left height of the first sub-block is LH, the lower width of the first sub-block is DW, and the x component of the top-left sample position of the first sub-block is 0 and the y component is 0, the location of the temporal neighboring block may be (DW−1, LH−1).

Further, when the target block is split into the fifth type, i.e., the split boundary crosses the upper boundary and the lower boundary of the target block, the upper width of the first sub-block is UW, the lower width of the first sub-block is DW, the size of the target block is N×N, and the x component of the top-left sample position of the target block is 0 and the y component is 0, the first motion information candidate list may include at least one of a first spatial candidate indicating the motion information of the first spatial neighboring block and a second spatial candidate indicating the motion information of the second spatial neighboring block, and a temporal candidate indicating the motion information of the temporal neighboring block in the co-located picture. In this case, the location of the first spatial neighboring block may be (UW, −1) and the location of the second spatial neighboring block may be (UW−1, −1), and the location of the temporal neighboring block may be (DW−1, N−1).

Further, when the target block is split into the fifth type, i.e., the split boundary crosses the upper boundary and the lower boundary of the target block, the upper width of the second sub-block is UW, the lower width of the second sub-block is DW, the right height of the second sub-block is RH, and the x component of the top-left sample position of the second sub-block is 0 and the y component is 0, the second motion information candidate list may include at least one of a first spatial candidate indicating the motion information of the first spatial neighboring block, a second spatial candidate indicating the motion information of the second spatial neighboring block, and a third spatial candidate indicating the motion information of the third spatial neighboring block, and a temporal candidate indicating the motion information of the temporal neighboring block in the co-located picture. In this case, the location of the first spatial neighboring block may be (UW−1−DW, RH), the location of the second spatial neighboring block may be (UW−1−DW, RH−1), the location of the third spatial neighboring block may be (−1, −1), and the location of the temporal neighboring block may be (UW−1, RH−1).

Further, when the target block is split into the fifth type, i.e., the split boundary crosses the upper boundary and the lower boundary of the target block, the upper width of the second sub-block is UW, the lower width of the first sub-block is DW, the size of the target block is N×N, and the x component of the top-left sample position of the target block is 0 and the y component is 0, the second motion information candidate list may include at least one of a first spatial candidate indicating the motion information of the first spatial neighboring block, a second spatial candidate indicating the motion information of the second spatial neighboring block, and a third spatial candidate indicating the motion information of the third spatial neighboring block, and a temporal candidate indicating the motion information of the temporal neighboring block in the co-located picture. In this case, the location of the first spatial neighboring block may be (N−1−DW, N), the location of the second spatial neighboring block may be (N−1−DW, N−1), the location of the third spatial neighboring block may be (N−1−UW, −1), and the location of the temporal neighboring block may be (N, N).

As another example, a sixth type may represent a type in which the first sub-block and the second sub-block have a rectangular shape and the upper boundary of the first sub-block and the lower width of the second sub-block are split to be the same as the height of the target block. Further, the sixth type may represent a type in which the split boundary crosses the left boundary and the right boundary of the target block.

Further, when the target block is split into the sixth type, i.e., the split boundary crosses the left boundary and the right boundary of the target block, the left height of the first sub-block is LH, and the x component of the top-left sample position of the first sub-block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (−1, LH) and the location of the second spatial neighboring block may be (−1, LH−1). Further, the first motion information candidate list may include a temporal candidate indicating motion information of the temporal neighboring block in the co-located picture. For example, when the target block is split into the sixth type, i.e., the split boundary crosses the left boundary and the right boundary of the target block, the left height of the first sub-block is LH, and the x component of the top-left sample position of the first sub-block is 0 and the y component is 0, the location of the temporal neighboring block may be (0, LH−1).

Further, when the target block is split into the sixth type, i.e., the split boundary crosses the left boundary and the right boundary of the target block, the left height of the first sub-block is LH, and the x component of the top-left sample position of the target block is 0 and the y component is 0, the first motion information candidate list may include a first spatial candidate indicating the motion information of the first spatial neighboring block and a second spatial candidate indicating the motion information of the second spatial neighboring block. In this case, the location of the first spatial neighboring block may be (−1, LH) and the location of the second spatial neighboring block may be (−1, LH−1). Further, the first motion information candidate list may include a temporal candidate indicating motion information of the temporal neighboring block in the co-located picture. For example, when the target block is split into the sixth type, i.e., the split boundary crosses the left boundary and the right boundary of the target block, the left height of the first sub-block is LH, and the x component of the top-left sample position of the target block is 0 and the y component is 0, the location of the temporal neighboring block may be (0, LH−1).

Further, when the target block is split into the sixth type, i.e., the split boundary crosses the left boundary and the right boundary of the target block, the lower width of the second sub-block is DW, the left height of the second sub-block is LH, the right height of the second sub-block is RH, and the x component of the top-left sample position of the second sub-block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (DW, LH−1−RH) and the location of the second spatial neighboring block may be (DW−1, LH−1−RH).

Further, when the target block is split into the sixth type, i.e., the split boundary crosses the left boundary and the right boundary of the target block, the right height of the second sub-block is RH, the size of the target block is N×N, and the x component of the top-left sample position of the target block is 0 and the y component is 0, the second motion information candidate list may include a first spatial candidate indicating the motion information of the first spatial neighboring block and a second spatial candidate indicating the motion information of the second spatial neighboring block. In this case, the location of the first spatial neighboring block may be (N, N−1−RH) and the location of the second spatial neighboring block may be (N−1, N−1−RH).

The decoding apparatus performs inter prediction of the first sub-block based on the first motion information candidate list and performs inter prediction of the second sub-block based on the second motion information candidate list (S1530). The decoding apparatus may separately perform the prediction for each of the first sub-block and the second sub-block.

The decoding apparatus may perform inter prediction of the first sub-block based on the first motion information candidate list. Specifically, the decoding apparatus may perform the motion information of the first sub-block based on the first motion information candidate list. For example, when the merge mode is applied to the first sub-block, the first motion information candidate list may represent a merge candidate list and the motion information of the candidate selected based on the merge index in the first motion information candidate list may be derived as the motion information of the first sub-block. Prediction information of the first sub-block may be obtained through the bitstream and the prediction information may include the merge index. The motion information of the first sub-block may include a reference picture index and a motion vector.

The decoding apparatus may perform the inter prediction for the first sub-block based on the motion information. Specifically, the decoding apparatus may derive a reference block of the first sub-block based on the motion information. That is, the decoding apparatus may derive a reference block indicating the motion vector in the reference picture indicated by the reference picture index. The decoding apparatus may predict the first sub-block based on the reference block. That is, the decoding apparatus may derive a reconstructed sample in the reference block as a predicted sample of the first sub-block.

Further, for example, when the motion vector prediction (MVP) mode is applied to the first sub-block, the first motion information candidate list may represent an MVP candidate list and a motion vector of the candidate selected based on the MVP flag in the first motion information candidate list may be derived as a motion vector predictor (MVP) of the first sub-block. The prediction information for the first sub-block may be obtained through the bitstream and the prediction information ma include the MVP flag, and the reference picture index and the motion vector difference (MVD) of the first sub-block. In this case, the decoding apparatus may derive the motion vector of the first sub-block by adding the MVP and the MVD.

The decoding apparatus may perform the inter prediction for the first sub-block based on the motion information. Specifically, the decoding apparatus may derive the reference block of the first sub-block based on the motion vector and the reference picture index. That is, the decoding apparatus may derive a reference block indicating the motion vector in the reference picture indicated by the reference picture index. The decoding apparatus may predict the first sub-block based on the reference block. That is, the decoding apparatus may derive a reconstructed sample in the reference block as a predicted sample of the first sub-block.

Further, the decoding apparatus may perform inter prediction of the second sub-block based on the second motion information candidate list. The decoding apparatus may perform the motion information of the second sub-block based on the second motion information candidate list. For example, when the merge mode is applied to the second sub-block, the second motion information candidate list may represent the merge candidate list and the motion information of the candidate selected based on the merge index in the second motion information candidate list may be derived as the motion information of the second sub-block. Prediction information of the second sub-block may be obtained through the bitstream and the prediction information may include the merge index. The motion information of the second sub-block may include the reference picture index and the motion vector.

The decoding apparatus may perform the inter prediction for the second sub-block based on the motion information. Specifically, the decoding apparatus may derive the reference block of the second sub-block based on the motion information. That is, the decoding apparatus may derive a reference block indicating the motion vector in the reference picture indicated by the reference picture index. The decoding apparatus may predict the second sub-block based on the reference block. That is, the decoding apparatus may derive the reconstructed sample in the reference block as the predicted sample of the second sub-block.

Further, for example, when the motion vector prediction (MVP) mode is applied to the second sub-block, the second motion information candidate list may represent the MVP candidate list and the motion vector of the candidate selected based on the MVP flag in the second motion information candidate list may be derived as the motion vector predictor (MVP) of the second sub-block. The prediction information for the second sub-block may be obtained through the bitstream and the prediction information may include the MVP flag, and the reference picture index and the motion vector difference (MVD) of the second sub-block. In this case, the decoding apparatus may derive the motion vector of the second sub-block by adding the MVP and the MVD.

The decoding apparatus may perform the inter prediction for the second sub-block based on the motion information. Specifically, the decoding apparatus may derive the reference block of the second sub-block based on the motion vector and the reference picture index. That is, the decoding apparatus may derive a reference block indicating the motion vector in the reference picture indicated by the reference picture index. The decoding apparatus may predict the second sub-block based on the reference block. That is, the decoding apparatus may derive the reconstructed sample in the reference block as the predicted sample of the second sub-block.

Further, the decoding apparatus may perform filtering for a first sample adjacent to the second sub-block among the samples of the first sub-block. The filtering may represent overlapped motion compensation filtering. For example, the decoding apparatus may derive sample value 1 of the first sample based on the motion information of the first sub-block and derive sample value 2 of the first sample based on the motion information of the second sub-block. Next, the decoding apparatus may derive a sample value of the first sample based on the sample value 1 and the sample value 2 of the first sample. For example, the decoding apparatus may derive the sample value of the first sample by weighted sum of the sample value 1 and the sample value 2 of the first sample. Further, the sample value of the first sample may be derived based on Equation 1 described above. Alternatively, the sample value of the first sample may be derived based on Equation 2 described above.

Further, the decoding apparatus may perform filtering for a first sample adjacent to the second sub-block and a second sample adjacent to the left side (or upper side) of the first sample among the samples of the first sub-block. The filtering may represent overlapped motion compensation filtering. For example, the decoding apparatus may derive sample value 1 of the first sample based on the motion information of the first sub-block and derive sample value 2 of the first sample based on the motion information of the second sub-block. Next, the decoding apparatus may derive a sample value of the first sample based on the sample value 1 and the sample value 2 of the first sample. For example, the decoding apparatus may derive the sample value of the first sample by weighted sum of the sample value 1 and the sample value 2 of the first sample. Further, the sample value of the first sample may be derived based on Equation 1 described above. Further, the decoding apparatus may derive sample value 1 of the first sample based on the motion information of the first sub-block and derive sample value 2 of the second sample based on the motion information of the second sub-block. Next, the decoding apparatus may derive a sample value of the first sample based on the sample value 2 and the sample value 2 of the second sample. For example, the decoding apparatus may derive the sample value of the first sample by weighted sum of the sample value 2 and the sample value 2 of the second sample. Further, the sample value of the second sample may be derived based on Equation 3 described above.

Further, the decoding apparatus may perform filtering for a first sample adjacent to the first sub-block among the samples of the second sub-block. The filtering may represent overlapped motion compensation filtering. For example, the decoding apparatus may derive sample value 1 of the first sample based on the motion information of the first sub-block and derive sample value 2 of the first sample based on the motion information of the second sub-block. Next, the decoding apparatus may derive a sample value of the first sample based on the sample value 1 and the sample value 2 of the second sample. For example, the decoding apparatus may derive the sample value of the first sample by weighted sum of the sample value 1 and the sample value 2 of the second sample. Further, the sample value of the first sample may be derived based on Equation 1 described above. Alternatively, the sample value of the first sample may be derived based on Equation 2 described above.

Further, the decoding apparatus may perform filtering for a first sample adjacent to the first sub-block and a second sample adjacent to the right side (or lower side) of the first sample among the samples of the second sub-block. The filtering may represent overlapped motion compensation filtering. For example, the decoding apparatus may derive sample value 1 of the first sample based on the motion information of the first sub-block and derive sample value 2 of the first sample based on the motion information of the second sub-block. Next, the decoding apparatus may derive a sample value of the first sample based on the sample value 1 and the sample value 2 of the second sample. For example, the decoding apparatus may derive the sample value of the first sample by weighted sum of the sample value 1 and the sample value 2 of the second sample. Further, the sample value of the first sample may be derived based on Equation 1 described above. Further, the decoding apparatus may derive sample value 1 of the first sample based on the motion information of the first sub-block and derive sample value 2 of the second sample based on the motion information of the second sub-block. Next, the decoding apparatus may derive a sample value of the first sample based on the sample value 2 and the sample value 2 of the second sample. For example, the decoding apparatus may derive the sample value of the first sample by weighted sum of the sample value 2 and the sample value 2 of the second sample. Further, the sample value of the second sample may be derived based on Equation 3 described above.

Meanwhile, the numbers of samples in the first sub-block and the second sub-block in which the filtering is performed may be determined in units of slice or block. Alternatively, the numbers of first sub-blocks and second sub-blocks in which the filtering is performed may be determined based on the size of the target block. For example, when the size of the target block is the 16×16 size, the filtering may be applied to one sample around the split boundary among the samples of the first sub-block and the second sub-block. That is, when the size of the target block is the 16×16 size, the filtering may be performed in the first sample adjacent to the second sub-block among the samples of the first sub-block and the filtering may be performed in the first sample adjacent to the first sub-block among the samples of the second sub-block. Further, when the size of the target block is larger than the 16×16 size, the filtering may be applied to two samples around the split boundary among the samples of the first sub-block and/or the second sub-block. That is, when the size of the target block is larger than the 16×16 size, the filtering may be performed for the first sample adjacent to the second sub-block and the second sample adjacent to the left side (or upper side) of the first sample among the samples of the first sub-block and the filtering may be performed for the first sample adjacent to the first sub-block and the second sample adjacent to the right side (or lower side) of the first sample among the samples of the second sub-block.

Meanwhile, the information indicating whether to apply the filtering may be transmitted by the unit such as sequence parameter set (SPS), picture parameter set (PPS), slice, block, etc., and whether to apply the filtering to the first sub-block and the second sub-block may be determined based on the information indicating whether to apply the filtering. Alternatively, whether to apply the filtering to the target block may be determined based on the information indicating whether to apply the filtering.

Meanwhile, the decoding apparatus may obtain residual information of the first sub-block and the second sub-block through the bitstream. In this case, the decoding apparatus may generate the residual signals of the first sub-block and the second sub-block by performing one transformation for the residual information of the first sub-block and the second sub-block. Here, the residual information may indicate transform coefficients. Further, the residual signal may represent residual samples.

Meanwhile, the decoding apparatus may obtain the residual information of the first sub-block and/or the residual information of the second sub-block through the bitstream. Further, the decoding apparatus may generate the residual signal of the first sub-block and the residual signal of the second sub-block by performing separate transformation for the residual information of the first sub-block and the residual information of the second sub-block.

For example, the residual information of the first sub-block is transformed based on a transform kernel of a size including the size of the first sub-block to generate the residual signal of the first sub-block. Here, the transform kernel may represent the transform kernel having the smallest size among transform kernels having sizes including the size of the first sub-block.

Alternatively, the residual information of the first sub-block is transformed to generate the residual signal of the first sub-block, but the residual signal may include a signal padded to 0 for the region of the second sub-block. In this case, the transform may be performed based on the transform kernel of the size of the target block.

Alternatively, the residual information of the first sub-block is transformed to generate the residual signal of the first sub-block, but the residual signal may include a residual signal included in a rearranged first sub-block. The rearranged first sub-block may be a block in which the first sub-block is rearranged in a rectangular shape.

The decoding apparatus may generate the reconstructed sample by adding the predicted sample of the first sub-block and the residual signal and generate the reconstructed picture based on the reconstructed sample. Further, the decoding apparatus may generate the reconstructed sample by adding the predicted sample of the second sub-block and the residual signal and generate the reconstructed picture based on the reconstructed sample. Thereafter, the decoding apparatus may apply an in-loop filtering procedure such as a deblocking filtering and/or SAO procedure to the reconstructed picture in order to enhance subjective/objective picture quality as necessary.

According to the present disclosure, according to split types of blocks split through a GP structure, spatial motion information candidates of the blocks can be derived, thereby enhancing prediction efficiency and enhancing overall coding efficiency.

Further, according to the present disclosure, according to the split types of blocks split through the GP structure, temporal motion information candidates of the blocks can be derived, thereby enhancing the prediction efficiency and enhancing the overall coding efficiency.

Further, according to the present disclosure, filtering samples around a boundary of the blocks split through the GP structure, thereby enhancing prediction accuracy and enhancing the overall coding efficiency.

In addition, according to the present disclosure, a transform process of the blocks split through the GP structure can be performed, thereby enhancing transform efficiency and enhancing the overall coding efficiency.

In the aforementioned embodiment, the methods are described based on the flowcharts as a series of steps or blocks, but the present disclosure is not limited to the order of steps, and a certain step may occur in different order from or simultaneously with a step different from that described above. Further, those skilled in the art will understand that the steps shown in the flowchart are not exclusive and other steps may be included or one or more steps in the flowcharts may be deleted without affecting the scope of the present disclosure.

The aforementioned method according to the present disclosure may be implemented in the form of software, and the encoding apparatus and/or the decoding apparatus according to the present disclosure may be included in the apparatus for performing image processing of, for example, a TV, a computer, a smartphone, a set-top box, a display device, and the like.

When the embodiments in the present disclosure are implemented in software, the aforementioned method may be implemented as a module (process, function, and the like) for performing the aforementioned function. The module may be stored in a memory and executed by a processor. The memory may be located inside or outside the processor, and may be coupled with the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium and/or other storage devices.

What is claimed is:

1. A video decoding method performed by a decoding apparatus, comprising:
    obtaining residual information and split information for a target block from a bitstream;
    splitting the target block into a first sub-partition and a second sub-partition based on a split boundary indicated by the split information;
    deriving a first motion information candidate list for the first sub-partition and a second motion information candidate list for the second sub-partition;
    deriving prediction samples in the first sub-partition based on the first motion information candidate list;
    deriving prediction samples in the second sub-partition based on the second motion information candidate list;
    deriving residual samples of the target block based on the residual information; and
    generating a reconstructed picture based on the prediction samples in the first sub-partition, the prediction samples in the second sub-partition and the residual samples,
    wherein the first sub-partition and the second sub-partition are non-rectangular partitions,
    wherein the split information includes information on an angle of the split boundary and a distance between the split boundary and a center of the target block,
    wherein the target block is split into the first sub-partition and the second sub-partition through the split boundary derived based on the information on the angle of the split boundary and the distance between the split boundary and the center of the target block, and
    wherein based on a right height of the second sub-partition being RH, a size of the target block being N×N, and an x component of a top-left sample position of the target block being 0 and a y component of the top-left sample position being 0,
    the second motion information candidate list includes at least one of a first spatial candidate indicating motion information of a first spatial neighboring block and a second spatial candidate indicating motion information of a second spatial neighboring block,
    a location of the first spatial neighboring block is (N, N−1−RH), and
    a location of the second spatial neighboring block is (N−1, N−1−RH).

2. The video decoding method of claim 1, wherein based on the split boundary crossing an upper boundary and a left boundary of the target block, an upper width of the first sub-partition being UW, a left height of the first sub-partition being LH, and an x component of a top-left sample position of the target block being 0 and a y component of the top-left sample position being 0,
    the first motion information candidate list includes at least one of a first spatial candidate indicating motion information of a first spatial neighboring block, a second spatial candidate indicating motion information of a second spatial neighboring block, a third spatial candidate indicating motion information of a third spatial neighboring block, a fourth spatial candidate indicating motion information of a fourth spatial neighboring block, and a temporal candidate indicating motion information of a temporal neighboring block in a co-located picture,
    a location of the first spatial neighboring block is (−1, LH),
    a location of the second spatial neighboring block is (−1, LH−1),
    a location of the third spatial neighboring block is (UW, −1),
    a location of the fourth spatial neighboring block is (UW−1, −1), and
    a location of the temporal neighboring block may be (0, LH−1).

3. The video decoding method of claim 1, wherein based on the split boundary crossing a right boundary and a lower boundary of the target block, a lower width of the first sub-partition being DW, a left height of the first sub-partition being LH, and an x component of a top-left sample position of the target block being 0 and a y component of the top-left sample position being 0, and
    a location of a temporal neighboring block is (DW−1, LH−1).

4. The video decoding method of claim 1, wherein based on the split boundary crossing a right boundary and a lower boundary of the target block, a lower width of the second sub-partition being DW, a right height of the second sub-partition being RH, a size of the target block being N x N, and an x component of a top-left sample position of the target block being 0 and a y component of the top-left sample position being 0, the second motion information candidate list includes at least one of a third spatial candidate indicating motion information of a third spatial neighboring block and a fourth spatial candidate indicating motion information of a fourth spatial neighboring block, a location of the third spatial neighboring block is (N−1−DW, N), and a location of the fourth spatial neighboring block is (N−1−DW, N−1).

5. The video decoding method of claim 1, wherein based on the split boundary crossing an upper boundary and a right boundary of the target block, an upper width of the first sub-partition being UW, and an x component of a top-left sample position of the target block being 0 and a y component of the top-left sample position being 0, the first motion information candidate list includes at least one of a first spatial candidate indicating motion information of a first spatial neighboring block and a second spatial candidate indicating motion information of a second spatial neighboring block, a location of the first spatial neighboring block is (UW, −1), and a location of the second spatial neighboring block is (UW−1, −1).

6. The video decoding method of claim 1, wherein based on the split boundary crossing an upper boundary and a right boundary of the target block, an upper width of the second sub-partition being UW, a size of the target block being N×N, and an x component of a top-left sample position of the target block being 0 and a y component of the top-left sample position being 0, the second motion information candidate list includes a temporal candidate indicating motion information of a temporal neighboring block in a co-located picture, a location of the temporal neighboring block is (N, N).

7. The video decoding method of claim 1, wherein based on the split boundary crossing a left boundary and a lower boundary of the target block, a left height of the first sub-partition being LH, a lower width of the first sub-partition being DW, a size of the target block being N×N, and an x component of a top-left sample position of the target block being 0 and a y component of the top-left sample position being 0, the first motion information candidate list includes a temporal candidate indicating motion information of a temporal neighboring block in a co-located picture, and a location of the temporal neighboring block is (DW−1, N−1).

8. The video decoding method of claim 1, wherein based on the split boundary crossing an upper boundary and a lower boundary of the target block, an upper width of the first sub-partition being UW, a lower width of the first sub-partition being DW, a size of the target block being N x N, and an x component of a top-left sample position of the target block being 0 and a y component of the top-left sample position being 0, the first motion information candidate list includes at least one of a first spatial candidate indicating motion information of a first spatial neighboring block, a second spatial candidate indicating motion information of a second spatial neighboring block, and a temporal candidate indicating motion information of a temporal neighboring block in a co-located picture, a location of the first spatial neighboring block is (UW, −1), a location of the second spatial neighboring block is (UW−1, −1), and a location of the temporal neighboring block is (DW−1, N−1).

9. The video decoding method of claim 1, wherein based on the split boundary crossing an upper boundary and a lower boundary of the target block, an upper width of the second sub-partition being UW, a lower width of the second sub-partition being DW, a size of the target block being N×N, and an x component of a top-left sample position of the target block being 0 and a y component of the top-left sample position being 0, the second motion information candidate list includes at least one of a third spatial candidate indicating motion information of a third spatial neighboring block, and a temporal candidate indicating motion information of a temporal neighboring block in a co-located picture, a location of the third spatial neighboring block is (N−1−UW, −1), and a location of the temporal neighboring block is (N, N).

10. The video decoding method of claim 1, wherein based on the split boundary crossing a left boundary and a right boundary of the target block, a left height of the first sub-partition being LH, and an x component of a top-left sample position of the target block being 0 and a y component of the top-left sample position being 0, the first motion information candidate list includes at least one of a first spatial candidate indicating motion information of a first spatial neighboring block, a second spatial candidate indicating motion information of a second spatial neighboring block, and a temporal candidate indicating motion information of a temporal neighboring block in a co-located picture, a location of the first spatial neighboring block is (−1, LH), a location of the second spatial neighboring block is (−1, LH−1), and a location of the temporal neighboring block may be (0, LH−1).

11. A video encoding method performed by an encoding apparatus, comprising:

splitting a target block into a first sub-partition and a second sub-partition;

deriving a first motion information candidate list for the first sub-partition and a second motion information candidate list for the second sub-partition;

deriving prediction samples in the first sub-partition based on the first motion information candidate list;

deriving prediction samples in the second sub-partition based on the second motion information candidate list;

deriving residual samples of the target block based on the prediction samples in the first sub-partition and the prediction samples in the second sub-partition; and encoding a bitstream including residual information and split information for the target block, wherein the first sub-partition and the second sub-partition are non-rectangular partitions, and wherein the split information includes information on an angle of a split boundary and a distance between the split boundary and a center of the target block, wherein the target block is split into the first sub-partition and the second sub-partition through the split boundary derived based on the information on the angle of the split boundary and the distance between the split boundary and the center of the target block, and wherein based on a right height of the second sub-partition being RH, a size of the target block being N×N, and an x component of a top-left sample position of the target block being 0 and a y component of the top-left sample position being 0, the second motion information candidate list includes at least one of a first spatial candidate indicating motion information of a first spatial neighboring block and a second spatial candidate indicating motion information of a second spatial neighboring block, a location of the first spatial neighboring block is (N, N−1−RH), and a location of the second spatial neighboring block is (N−1, N−1−RH).

12. A non-transitory computer-readable storage medium storing a bitstream generated by a method, the method comprising:

splitting a target block into a first sub-partition and a second sub-partition;

deriving a first motion information candidate list for the first sub-partition and a second motion information candidate list for the second sub-partition;

deriving prediction samples in the first sub-partition based on the first motion information candidate list;

deriving prediction samples in the second sub-partition based on the second motion information candidate list;

deriving residual samples of the target block based on the prediction samples in the first sub-partition and the prediction samples in the second sub-partition; and generating the bitstream including residual information and split information for the target block, wherein the first sub-partition and the second sub-partition are non-rectangular partitions, and wherein the split information includes information on an angle of a split boundary and a distance between the split boundary and a center of the target block, wherein the target block is split into the first sub-partition and the second sub-partition through the split boundary derived based on the information on the angle of the split boundary and the distance between the split boundary and the center of the target block, and wherein based on a right height of the second sub-partition being RH, a size of the target block being N×N, and an x component of a top-left sample position of the target block being 0 and a y component of the top-left sample position being 0, the second motion information candidate list includes at least one of a first spatial candidate indicating motion information of a first spatial neighboring block and a second spatial candidate indicating motion information of a second spatial neighboring block, a location of the first spatial neighboring block is (N, N−1−RH), and a location of the second spatial neighboring block is (N−1, N−1−RH).

* * * * *

UNITED STATES PATENT AND TRADEMARK OFFICE
CERTIFICATE OF CORRECTION

| | | |
|---|---|---|
| PATENT NO. | : 11,627,319 B2 | Page 1 of 1 |
| APPLICATION NO. | : 17/552204 | |
| DATED | : April 11, 2023 | |
| INVENTOR(S) | : Junghak Nam and Jaehyun Lim | |

It is certified that error appears in the above-identified patent and that said Letters Patent is hereby corrected as shown below:

On the Title Page

In Item (63), Column 1, Line 1, after "filed" insert -- on Aug. 21, 2020, now Pat. No. 11,233,996, which is a National stage application of International --, therefor.

In Item (63), Column 1, Line 1, after "filed" delete "as".

In Item (63), Column 1, Line 2, after "PCT/KR2018/002177" insert -- , filed --.

In Item (63), Column 1, Line 3, after "2018," delete "now Pat. No. 11,233,996".

Signed and Sealed this
Eleventh Day of June, 2024

Katherine Kelly Vidal
*Director of the United States Patent and Trademark Office*